United States Patent
Xu et al.

(10) Patent No.: US 11,456,795 B2
(45) Date of Patent: Sep. 27, 2022

(54) ELECTRONIC DEVICE AND METHOD FOR MEASURING A BEAM QUALITY OF A CURRENTLY SERVING BEAM BASED ON A PREDICTION WINDOW WHEN THE DETECTED BEAM QUALITY IS WITHIN A PARTICULAR RANGE

(71) Applicant: Sony Corporation, Tokyo (JP)

(72) Inventors: Jin Xu, Beijing (CN); Wenjing Ren, Beijing (CN); Dongru Li, Beijing (CN); Hang Yang, Beijing (CN); Xiaofeng Tao, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 17/054,783

(22) PCT Filed: May 10, 2019

(86) PCT No.: PCT/CN2019/086354
§ 371 (c)(1),
(2) Date: Nov. 12, 2020

(87) PCT Pub. No.: WO2019/218936
PCT Pub. Date: Nov. 21, 2019

(65) Prior Publication Data
US 2021/0218457 A1    Jul. 15, 2021

(30) Foreign Application Priority Data
May 17, 2018    (CN) .......................... 201810473952.3

(51) Int. Cl.
*H04B 7/06*    (2006.01)
*H04W 76/19*    (2018.01)
(Continued)

(52) U.S. Cl.
CPC ........... *H04B 7/0695* (2013.01); *H04B 7/088* (2013.01); *H04W 72/046* (2013.01); *H04W 72/085* (2013.01); *H04W 76/19* (2018.02)

(58) Field of Classification Search
CPC ..... H04B 7/0695; H04B 7/088; H04W 76/19; H04W 72/046; H04W 72/085;
(Continued)

(56) References Cited

U.S. PATENT DOCUMENTS

2018/0006770 A1    1/2018 Guo et al.
2018/0288756 A1*  10/2018 Xia ..................... H04L 41/0654
(Continued)

FOREIGN PATENT DOCUMENTS

| CN | 107547115 A | 1/2018 |
|----|-------------|--------|
| CN | 107567038 A | 1/2018 |

(Continued)

OTHER PUBLICATIONS

Mediatek Inc: "Offline discussion summary on remaining issues on Beam Failure Recovery", 3GPP Draft; R1-1721699_7 2 2 4_Summary_Bfrecovery_V12, 3rd Generation Partnership Project (3GPP), Mobile Competence Centre ; 650, Route Des Lucioles ; F-06921 Sophi•Lantipolis Cedex ; France vol. RAN WG1, No. Reno, USA; Nov. 27, 2017-Dec. 1, 2017 Dec. 4, 2017 Dec. 4, 2017), XP051370777, Retrieved from the Internet: URL:http://www.3gpp.org/ftp/tsg%5Fran/WG1%5FRL1/TSGR1 %5F91 /Docs/[retrieved on Dec. 4, 2017].

(Continued)

*Primary Examiner* — Mewale A Ambaye
(74) *Attorney, Agent, or Firm* — Xsensus LLP

(57) ABSTRACT

An electronic device and method for wireless communication, the method including detecting a beam quality of a currently serving beam; starting a prediction window when the detected beam quality is within a particular range, and (Continued)

evaluating the beam quality of the currently serving beam within the prediction window.

13 Claims, 17 Drawing Sheets

(51) Int. Cl.
  *H04B 7/08* (2006.01)
  *H04W 72/04* (2009.01)
  *H04W 72/08* (2009.01)
(58) Field of Classification Search
  CPC ............. H04W 36/0033; H04W 16/28; H04W 72/087; H04W 72/10; H04W 72/04; H04W 72/08
  See application file for complete search history.

(56) References Cited

U.S. PATENT DOCUMENTS

| | | | |
|---|---|---|---|
| 2019/0053314 A1* | 2/2019 | Zhou | H04L 27/2611 |
| 2019/0075014 A1* | 3/2019 | Zhou | H04W 76/19 |
| 2019/0082334 A1* | 3/2019 | Nagaraja | H04W 72/04 |
| 2019/0159100 A1* | 5/2019 | Liou | H04B 7/0617 |
| 2019/0215048 A1* | 7/2019 | Cirik | H04B 7/088 |
| 2019/0306875 A1* | 10/2019 | Zhou | H04B 7/0617 |

FOREIGN PATENT DOCUMENTS

| | | | | |
|---|---|---|---|---|
| WO | 2017/063333 A1 | 4/2017 | | |
| WO | WO-2019030725 A1 * | 2/2019 | ........... | H04B 7/0626 |

OTHER PUBLICATIONS

Mediatek Inc: "Summary on Remaing issues on Beam Failure Recovery", 3GPP Draft; R1-1803362 7 1 22 4 Summary Bfrecovery_V05, 3rd Generation Partnership Project (3GPP), Mobile Competence Centre ; 650, Route Des Lucioles ; F-06921 Sophi•Lantipolis Cedex ; France vol. RAN WG1, No. Athens, Greece; Feb. 26, 2018-Mar. 2, 2018 Feb. 28, 2018 Feb. 28, 2018), XP051398532, Retrieved from the Internet:URL:http://www.3gpp.org/ftp/tsg%5Fran/WG1 %5FRL1/TSGR1 %5F92/Docs/[retrieved on Feb. 28, 2018].

Nokia et al: "Remaining Details on Beam Recovery", 3GPP Draft; R1-1800752, 3rd Generation Partnership Project (3GPP), Mobile Competence Centre ; 650, Route Des Lucioles ; F-06921 Sophia-Antipolis Cedex ; France vol. RAN WG1, No. Vancouver, Canada; Jan. 22, 2018-Jan. 26, 2018 Jan. 13, 2018 (Jan. 13, 2018), XP051385063, Retrieved from the Internet: URL:http://www.3gpp.org/ftp/tsg%5Fran/WG1%5FRL1/TSGR1%5FAH/NR%5FAH%5F1801 /Docs/ [retrieved on Jan. 13, 2018].

International Search Report and Written Opinion dated Jul. 17, 2019 for PCT/CN2019/086354 filed on May 10, 2019, 9 pages including English Translation of the International Search Report.

3GPP, "New Radio (NR) Access Technology", 3GPP TSG RAN Meeting No. 78, RP-172461, Lisbon, Portugal, Dec. 18-21, 2017, pp. 1-140.

* cited by examiner

| Beam | BLER | RSRP |
|---|---|---|
| Beam 1 | 0.9% | -70dBm |
| Beam 2 | 0.7% | -85dBm |
| Beam 3 | 0.5% | -100dBm |
| Beam 4 | 0.6% | -102dBm |

Figure 3

| Beam | BLER | RSRP |
|---|---|---|
| Beam 1 | 0.9% | -70dBm |
| Beam 2 | 0.8% | -85dBm |
| Beam 3 | --- | -100dBm |
| Beam 4 | --- | -102dBm |

Figure 4

| Beam | BLER | RSRP |
|---|---|---|
| Beam 1 | 0.9% | -70dBm |
| Beam 2 | 2% | -85dBm |
| Beam 3 | 0.7% | -100dBm |
| Beam 4 | --- | -102dBm |

Figure 5

ELECTRONIC DEVICE AND METHOD FOR MEASURING A BEAM QUALITY OF A CURRENTLY SERVING BEAM BASED ON A PREDICTION WINDOW WHEN THE DETECTED BEAM QUALITY IS WITHIN A PARTICULAR RANGE

CROSS-REFERENCE TO RELATED APPLICATIONS

The present disclosure application is based on PCT filing PCT/CN2019/086354, filed May 10, 2019, which claims priority to Chinese Patent Application No. 201810473952.3, titled "ELECTRONIC DEVICE AND METHOD FOR WIRELESS COMMUNICATION, AND COMPUTER READABLE STORAGE MEDIUM", filed on May 17, 2018 with China National Intellectual Property Administration, each of which is incorporated herein by reference in its entirety.

FIELD

The present disclosure relates to the technical field of wireless communications, and in particular to a beam management technology in New Radio (NR) communications. More particularly, the present disclosure relates to an electronic apparatus and a method for wireless communications, and a computer readable storage medium.

BACKGROUND

As a next generation of radio access scheme of Long Term Evolution (LTE), New Radio (NR) is a radio access technology (RAT) different from the LTE. NR is an access technology applicable to various use cases such as Enhanced mobile broadband (eMBB), Massive machine type communications (mMTCs) and Ultra reliable and low latency communications (URLLCs).

Multiple input multiple output (MIMO) technology may also be adopted in NR. In NR MIMO, beam management is very important for ensuring the communication quality. For example, in a case that the beam quality of a beam serving user equipment is reduced to a certain degree, the beam becomes unavailable, and it is considered that a beam failure has occurred. In this case, a beam failure recovery mechanism is required to reallocate a new beam for data transmission of the user equipment.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry, configured to: perform beam failure detection on a currently serving beam using a first quality index of a beam; and select a candidate beam from among other beams using the first quality index of the beam and a second quality index of the beam which is different from the first quality index, the candidate beam being used for beam recovery after beam failure.

According to an aspect of the present disclosure, a method for wireless communications is provided. The method includes: performing beam failure detection on a currently serving beam using a first quality index of a beam; and selecting a candidate beam from among other beams using the first quality index of the beam and a second quality index of the beam which is different from the first quality index, the candidate beam being used for beam recovery after beam failure.

The electronic apparatus and the method according to the aspects of the present disclosure perform selection of candidate beams based on two quality indexes including quality indexes used in beam failure detection, such that occurrence of the ping-pong effect can be effectively avoided, thereby reducing the latency due to beam failure recovery.

According to another aspect of the present disclosure, an electronic apparatus for wireless communications is provided. The electronic apparatus includes processing circuitry, configured to: perform detecting on beam quality of a currently serving beam, and determine that a beam failure occurs in a case of the beam quality being lower than first quality; and in a case of the beam failure occurring, perform detecting on beam quality of another beam, and take the beam as a candidate beam in a case of the beam quality being higher than a second quality, wherein the second quality is higher than the first quality.

According to another aspect of the present disclosure, a method for wireless communications is provided. The method includes: performing detecting on beam quality of a currently serving beam, and determine that a beam failure occurs in a case of the beam quality being lower than first quality; and in a case of the beam failure occurring, performing detecting on beam quality of another beam, and taking the beam as a candidate beam in a case of the beam quality being higher than a second quality, wherein the second quality is higher than the first quality.

The electronic apparatus and the method according to the aspects of the present disclosure can effectively reduce the latency due to beam failure recovery by selecting a candidate beam with higher beam quality requirement than beam quality requirement adopted in beam failure detection.

According to another aspect of the present disclosure, an electronic apparatus for wireless communications is provided. The electronic apparatus includes processing circuitry, configured to: detect beam quality of a currently serving beam; and start a prediction window when the detected beam quality is within a particular range, and evaluate the beam quality of the currently serving beam within the prediction window.

According to another aspect of the present disclosure, a method for wireless communications is provided. The method includes: detecting beam quality of a currently serving beam; and starting a prediction window when the detected beam quality is within a particular range, and evaluating the beam quality of the currently serving beam within the prediction window.

The electronic apparatus and the method according to the aspects of the present disclosure may pre-evaluate the beam quality of the currently serving beam by setting the prediction window, so as to quickly determine switch operation or recovery operation to be performed, thereby reducing the latency.

According to another aspect of the present disclosure, an electronic apparatus for wireless communications is provided. The electronic apparatus includes processing circuitry, configured to: determine, based on information about a tail window contained in a beam failure recovery request response from a base station, a size of the tail window to be opened; and open the tail window and detect beam quality of a new beam within the tail window.

According to another aspect of the present disclosure, a method for wireless communications is provided. The method includes: determining, based on information about a tail window contained in a beam failure recovery request response from a base station, a size of the tail window to be opened; and opening the tail window and detect beam quality of a new beam within the tail window.

The electronic apparatus and the method according to the aspects of the present disclosure may quickly perform beam recovery by detecting the beam quality of the new beam in the tail window in a case that the new beam fails again, thereby reducing the latency.

According to another aspect of the present disclosure, an electronic apparatus for wireless communications is provided. The electronic apparatus includes processing circuitry, configured to: generate configuration for beam failure recovery operation of user equipment and contain the configuration in a radio resource control signaling to be provided to the user equipment; and generate a beam failure recovery request response in response to a beam failure recovery request from the user equipment, wherein the configuration includes one or more of the following: multiple beam quality thresholds for beam quality evaluation, a first beam quality threshold and a second beam quality threshold for candidate beam selection, a duration of a timer for candidate beam selection, a size of a prediction window for beam quality evaluation.

According to another aspect of the present disclosure, a method for wireless communications is provided. The method includes: generating configuration for beam failure recovery operation of user equipment and containing the configuration in a radio resource control signaling to be provided to the user equipment; and generating a beam failure recovery request response in response to a beam failure recovery request from the user equipment, wherein the configuration includes one or more of the following: multiple beam quality thresholds for beam quality evaluation, a first beam quality threshold and a second beam quality threshold for candidate beam selection, a duration of a timer for candidate beam selection, a size of a prediction window for beam quality evaluation.

The electronic apparatus and the method according to the aspects of the present disclosure may achieve high-efficiency, low-latency beam failure recovery by configuring the beam failure recovery operation of the user equipment.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 3 is a schematic example of selecting 2 candidate beams from among 4 beams;

FIG. 4 is another schematic example of selecting 2 candidate beams from among 4 beams;

FIG. 5 is another schematic example of selecting 2 candidate beams from among 4 beams;

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
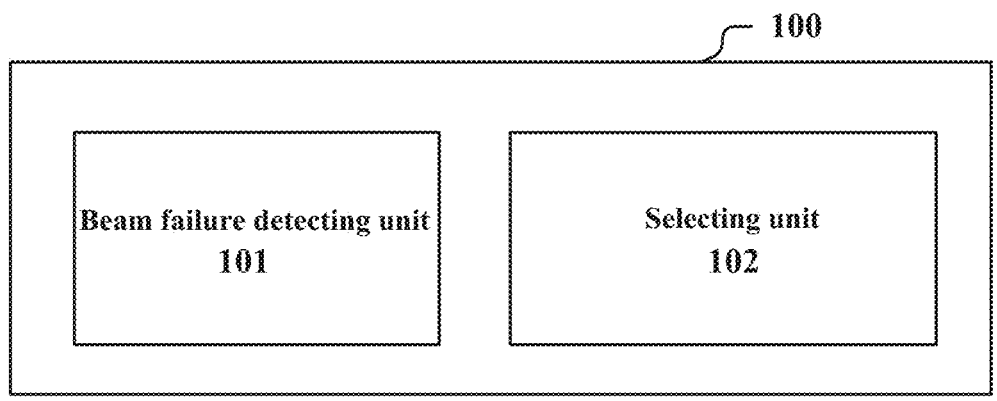
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes: a beam failure detecting unit 101, configured to perform beam failure detection on a currently serving beam using a first quality index of a beam; and a selecting unit 102, configured to select a candidate beam from among other beams using the first quality index of the beam and a second quality index of the beam which is different from the first quality index, the candidate beam being used for beam recovery after beam failure.

The beam failure detecting unit 101 and the selecting unit 102 may be implemented by one or more processing circuitries, and the processing circuitries may be implemented, for example, as a chip. It should be noted that, functional units in the apparatus shown in FIG. 1 only represent logic modules divided according to the implemented specific functions, and are not intended to limit the implementations. This also adapts to examples of other electronic apparatuses to be described later.

The electronic apparatus 100 may be, for example, arranged at user equipment (UE) side, or may be communicatively connected to the UE. Here, it should be noted that the electronic apparatus 100 may be implemented in a chip level or in a device level. For example, the electronic apparatus 100 may function as the UE itself, and may further include an external device such as a memory and a transceiver (not shown in the figure). The memory may be configured to store program and related data information for implementing various functions by the user equipment. The transceiver may include one or more communication interfaces to support communication with various devices (for example a base station, other UE and the like). The implementation of the transceiver is not limited here. This also adapts to the description of other configuration examples for the electronic apparatus at the UE side later.

Figure 2:
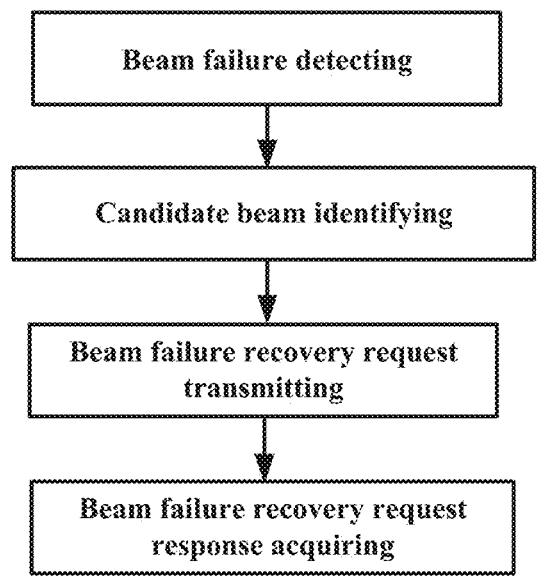
FIG. 2 is a schematic diagram showing a procedure of beam failure recovery mechanism performed by the UE side.

The beam failure recovery mechanism performed by the UE side may include phases such as beam failure detection, candidate beam identification, beam failure recovery request transmission, and beam failure recovery request response acquisition, as shown in FIG. 2. In a phase of the beam failure detection, the UE detects beam quality of the currently serving beam to determine whether a beam failure trigger condition is met; in a phase of the candidate beam identification, the UE selects a candidate beams serving as alternative of the currently serving beam from among other beams; in a phase of the beam failure recovery request transmission, the UE transmits a beam failure recovery request to the base station (or transmit receive point, hereinafter simply referred to as a base station), the beam failure recovery request may include, for example, information about identifying the UE and the candidate beam; in a phase of the beam failure recovery request response acquisition, the UE monitors the response to the beam failure recovery request from the base station within a predetermined time window (which may be referred to as a beam failure recovery window). The response may include one or more of the following: confirmation of beam failure recovery; time to switch to the new beam, that is, after a certain period of time, the base station and the UE will be switched to the new beam at the same time; the identification or indication of the switched new beam.

In the beam failure detection operation and the candidate beam selection operation, the beam quality is required to be evaluated. There are various indexes that may be used for beam quality evaluation, including but being not limited to a block error rate (BLER), reference signal receiving power (RSRP) of a physical downlink control channel (PDCCH), or the like. The reference signal is, for example, channel status information reference signal (CSI-RS). In a case that a quality index for beam failure detection is different from a quality index for candidate beam selection, there may be a ping-pong effect. For example, the second quality index of the selected candidate beam meets quality requirements of normal communication, however, the first quality index of the selected candidate beam meets a trigger condition of the beam failure detection, which will trigger the beam failure recovery mechanism again, thereby increasing unnecessary time delay.

In this embodiment, the beam failure detecting unit 101 performs beam failure detection on the currently serving beam using the first quality index of the beam, and the selecting unit 102 selects a candidate beam from among other beams using the first quality index of the beam and the second quality index of the beam which is different from the first quality index, for beam recovery. For example, the first quality index is the BLER of the PDCCH, which is also referred to as a hypothetical PDCCH BLER, and hereinafter simply referred to as BLER; the second quality index is RSRP, which is also referred to as L1-RSRP. It should be understood that although the BLER and the RSRP are taken as an example in some description hereinafter, the settings of the first quality index and the second quality index are not limited thereto.

Even in some cases, the first quality index and the second quality index may also be the same quality index, such as BLER or RSRP, which is not restrictive. Moreover, the term "first", "second" and the like are only for the purpose of distinguishing, rather than indicating any meaning of an order.

In one example, the selecting unit 102 is configured to select, from among beams of which the first quality indexes meet a first predetermined condition, one or more beams of which the second quality indexes meet a second predetermined condition and are optimal, as candidate beams.

For example, in a case that the beam quality indicated by the first quality index is higher than a first predetermined quality, it is considered that the first predetermined condition is met; and in a case that the beam quality indicated by the second quality index is higher than a second predetermined quality, it is considered that the second predetermined condition is met. The first predetermined quality and the second predetermined quality may be substantially equal or different. As the beam quality is better, the beam is better.

It is assumed that the first quality index is BLER and the second quality index is RSRP, the beam failure detecting unit 101 compares the BLER of the currently serving beam with a first threshold such as 1%. If the BLER is higher than the threshold, it is considered that a beam failure has occurred. Subsequently, when selecting the candidate beam, the selecting unit 102 considers not only the RSRP of the candidate beam, but also the BLER of the candidate beam. In other words, it is not only to ensure that the RSRP of the selected candidate beam is higher than the second threshold, such as −105 dBm, but also to ensure that the BLER of the selected candidate beam is lower than the first threshold, such as 1%. The beam quality indicated by the first threshold and the beam quality indicated by the second threshold may be considered to be substantially equivalent.

In this example, for example, N candidate beams are required to be selected, where the value of N may be configured by the base station, and the selecting unit selects, from among the beams of which the BLER is lower than the first threshold, the top N beams with the highest RSRPs and of which the RSRPs are higher than the second threshold, as candidate beams. FIG. 3 shows a schematic example of selecting 2 candidate beams from among 4 beams. In FIG. 3, the BLER of each of the listed four beams is lower than the first threshold and are ranked in a descending order of the RSRP. In a case of N being equal to 2, beam 1 and beam 2 are selected as candidate beams. It should be understood that FIG. 3 is only a schematic example, and are not intended to limit the present disclosure.

In another example, the selecting unit 102 is configured to select, from among beams of which the second quality indexes meet a second predetermined condition, one or more beams of which the first quality indexes meet a first predetermined condition and are optimal, as candidate beams. Still taking the first quality index BLER and the second quality index RSRP as an example, the selecting unit 102 selects, from among the beams of which the RSRPs are higher than the second threshold, the top N beams of which BLERs are lower than the first threshold and are the lowest, as candidate beams. For the schematic example shown in FIG. 3, the selecting unit 102 selects beam 3 and beam 4 with the lowest BLERs as candidate beams.

In yet another example, the selecting unit 102 is configured to sequentially determine, in an order of beam quality indicated by the second quality index from high to low, whether the first quality index of each beam meets a first predetermined condition, with respect to beams of which the second quality indexes meet a second predetermined condition, and take a beam of which the first quality index meets the first predetermined condition as a candidate beam until the number of candidate beams reaches a requirement. Still taking the first quality index BLER and the second quality index RSRP as an example, the selecting unit 102 may calculate the BLER for the N beams with the highest RSRP among the beams of which RSRPs are higher than the second threshold. If the BLER is lower than the first threshold, the corresponding beam is taken as a candidate beam. FIG. 4 is a schematic diagram showing a selection of candidate beams in this example. It may be seen that in a case that beam 1 and beam 2 meet the conditions, there is no need to calculate the BLERs of beam 3 and beam 4, thereby reducing calculation load.

On the other hand, if there are beams of which BLERs are higher than the first threshold, that is, N candidate beams may not be obtained, the BLER of the beam with a lower RSRP is continued to be calculated until N candidate beams are obtained. FIG. 5 is a schematic diagram showing a selection of candidate beams in this case. As shown in FIG. 5, since the BLER of beam 2 is higher than the threshold value of 1%, the BLER of beam 3 is continued to be calculated. The BLER of beam 3 is lower than the threshold, such that beam 1 and beam 3 are selected as candidate beams.

As described above, the selecting unit 102 uses the first threshold for the first quality index in a case of selecting the candidate beams. Furthermore, the third threshold different from the first threshold may also be used to perform evaluation on beam quality based on the first quality index. In this case, the selecting unit 102 performs a selection of candidate beams by comparing the first quality index of the beam with the third threshold and comparing the second quality index of the beam with the second threshold.

For example, the beam quality represented by the third threshold may be better than the beam quality represented by the first threshold, and the beam quality represented by the second threshold may be better than the beam quality represented by the first threshold. Alternatively, the third threshold and the first threshold may be set to be equal, and the beam quality represented by the second threshold is better than the beam quality represented by the first threshold. In other words, the selecting unit 102 may select candidate beams with higher beam quality requirements, so as to improve the stability of the new beam after the beam failure recovery, thereby reducing a time delay.

In a case that the first quality index and the second quality index are the same, a gap value may be added on a basis of the first threshold for beam failure detection, which serves as the second threshold for candidate beam selection. For example, in a case that the first quality index and the second quality index both are BLER, the gap value is negative; in a case that the first quality index and the second quality index both are RSRP, the gap value is positive.

Furthermore, the selecting unit 102 is further configured to set a timer when performing a selection of candidate beams, to perform detecting of the first quality index and the second quality index of the beam within a timing duration of the timer, and select the beam as a candidate beam in a case that the first quality index and the second quality index both meet the predetermined condition of serving as a candidate beam within the timing duration. By setting the timer, the stability of the beam quality of the selected candidate beam may be ensured, thereby effectively avoiding the ping-pong effect. The timing duration of the timer may be, for example, referred to as a candidate beam detection window. It may be understood that, in a case that the first quality index and the second quality index are different, timers with different timing durations may also be set for the first quality index and the second quality index, respectively.

Information about the setting of one or more of the first threshold, the second threshold, the third threshold, the size of the candidate beam detection window, and the gap value may be obtained from the base station via a Radio Resource Control (RRC) signaling.

The electronic apparatus according to this embodiment performs selection of candidate beams based on two quality indexes including quality index used in beam failure detection, such that the occurrence of the ping-pong effect can be effectively avoided, thereby reducing the time delay.

Second Embodiment

Figure 6:
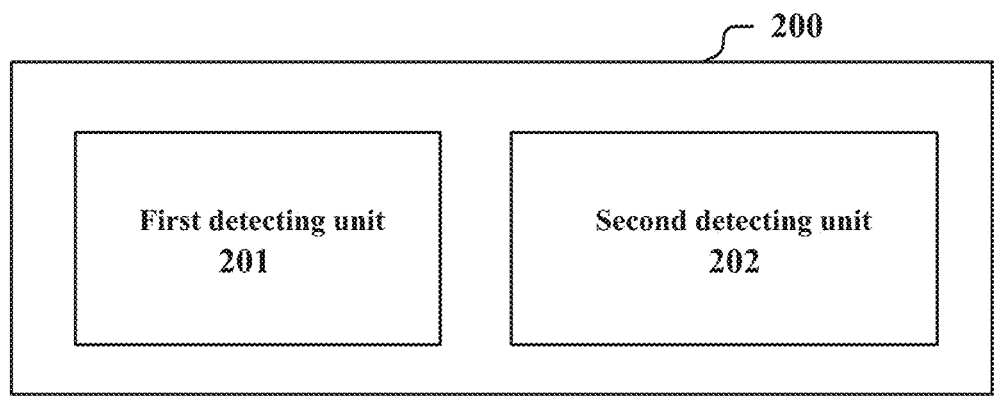
FIG. 6 is a block diagram showing functional modules of an electronic apparatus for wireless communications according to another embodiment of the present disclosure.

FIG. 6 is a block diagram showing functional modules of an electronic apparatus 200 for wireless communications according to another embodiment of the present disclosure. The electronic apparatus 200 includes: a first detecting unit 201, configured to perform detecting on beam quality of a currently serving beam, and determine that a beam failure occurs in a case of the beam quality being lower than a first quality; and a second detecting unit 202, configured to perform detecting on beam quality of another beam in a case of the beam failure occurring and select the beam as a candidate beam in a case of the beam quality being higher than a second quality, where the second quality is higher than the first quality.

Similarly, the first detecting unit 201 and the second detecting unit 202 may be implemented by one or more processing circuitries, the processing circuitries may be implemented, for example, as a chip. It should be noted that, functional units in the apparatus shown in FIG. 6 only represent logic modules divided according to the implemented specific functions, and are not intended to limit the implementations. Similarly, the electronic apparatus 200 may be, for example, arranged at user equipment (UE) side, or may be communicatively connected to the UE.

According to this embodiment, since the second quality is higher than the first quality, the beam quality of the candidate beam selected by the second detecting unit 202 is higher, such that the occurrence of the ping-pong effect can be avoided.

The beam quality may be represented by BLER or RSRP. In addition, the representation of the beam quality used by the first detecting unit 201 and the representation of the beam quality used by the second detecting unit 202 may be the same or different.

The second detecting unit 102 is further configured to set a timer when performing a selection of candidate beams, to perform detecting on the beam quality of the beam within a timing duration of the timer, and select the beam as the candidate beam in a case that the beam quality of the beam is higher than the second quality index within the timing duration.

Figure 7:
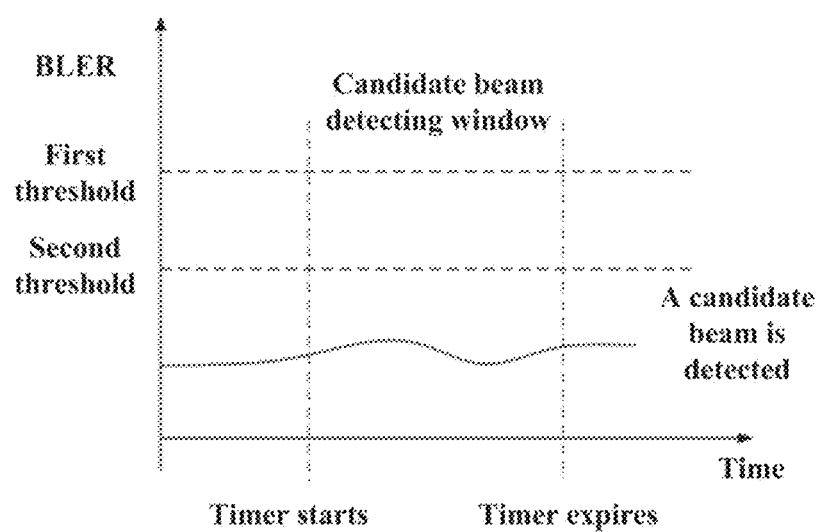
FIG. 7 is a schematic diagram showing a selection of candidate beams in a case of adopting a block error rate as a quality index of a beam.
Figure 8:
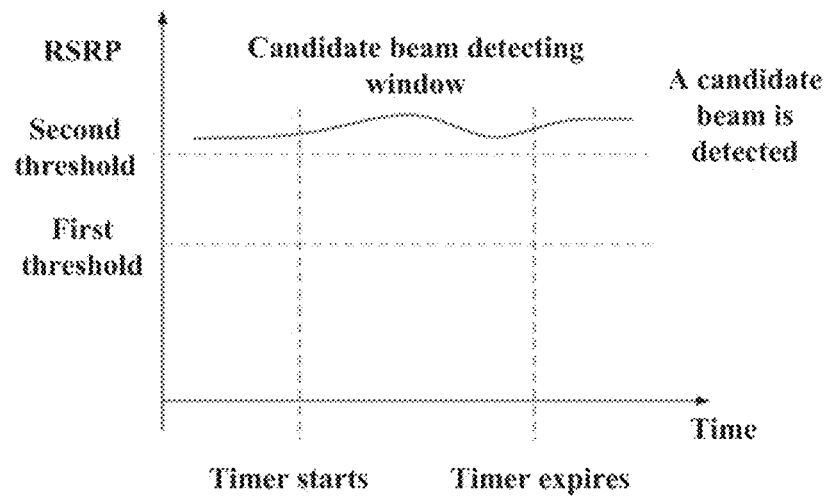
FIG. 8 is a schematic diagram showing a selection of candidate beams in a case of adopting reference signal receiving power as an index of beam quality.

As an example, FIG. 7 is a schematic diagram showing a selection of candidate beams in a case that BLER is used as an index of beam quality. A first threshold corresponds to the first quality, a second threshold corresponds to the second quality, and the duration of the timer is referred to as a candidate beam detection window. FIG. 8 is a schematic diagram showing a selection of candidate beams in a case of adopting RSRP as an index of beam quality.

It may be seen that the second threshold is equivalent to the first threshold plus a gap. In a case that the quality indexes are BLER, the gap value is negative; in a case that the quality indexes are RSRP, the gap value is positive.

Information about the setting of one or more of the first quality, the second quality, the timing duration of the timer (that is, the size of the candidate beam detection window), and the gap value may be obtained from the base station via a Radio Resource Control (RRC) signaling.

The electronic apparatus and method according to this aspect of the present disclosure can effectively reduce the time delay caused by beam failure recovery and avoid the ping-pong effect, by selecting candidate beams with beam quality requirements that are higher than those required for beam failure detection.

Third Embodiment

Figure 9:
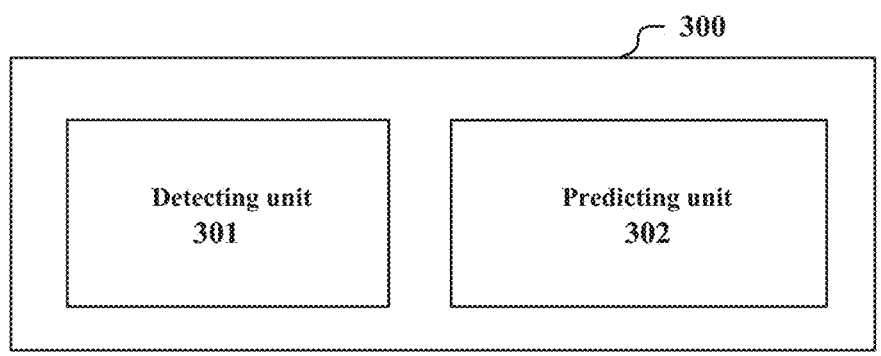
FIG. 9 is a block diagram showing functional modules of an electronic apparatus for wireless communications according to another embodiment of the present disclosure.

FIG. 9 is a block diagram showing functional modules of an electronic apparatus 300 for wireless communications according to another embodiment of the present disclosure. The electronic apparatus 300 includes: a detecting unit 301, configured to detect beam quality of a currently serving beam; and a predicting unit 302, configured to start a prediction window when the detected beam quality is within a particular range, and evaluate the beam quality of the currently serving beam within the prediction window.

The detecting unit 301 and the predicting unit 302 may be implemented by one or more processing circuitries, and the processing circuitries may be implemented, for example, as a chip. It should be noted that, functional units in the apparatus shown in FIG. 9 only represent logic modules divided according to the implemented specific functions, and are not intended to limit the implementations.

The electronic apparatus 300 may be, for example, arranged at user equipment (UE) side or may be communicatively connected to the UE. Here, it should also be noted that the electronic apparatus 300 may be implemented in a chip level or a device level. For example, the electronic apparatus 300 may function as the user equipment itself, and may also include external devices such as a memory, a transceiver (not shown in the figure), and the like. The memory may be configured to store program and related data information for implementing various functions by the user equipment. The transceiver may include one or more communication interfaces to support communication with various devices (for example, a base station, other UE and the like). The implementation of the transceiver is not limited here.

In multiple scenarios served by NR, there are scenarios in which the requirements on the time delay are very strict. In this embodiment, in order to further reduce the time delay due to beam failure recovery or beam switching, a scheme of setting a prediction window is proposed, such that beam failure recovery or beam switching can be quickly performed, thereby reducing the time delay.

For example, in a case that the beam quality of the currently serving beam is reduced to a certain degree, the predicting unit 302 starts a prediction window, and continues to perform detecting on the beam quality of the currently serving beam in the prediction window, to evaluate or predict whether the currently serving beam would fail or get worse.

The beam quality may be represented by one or more of the following: BLER, RSRP, and Reference Signal Receiving Quality (RSRQ) of the PDCCH.

In an example, multiple thresholds for beam quality may be set. In a case that the beam quality is lower than the worst beam quality indicated by the threshold, it indicates that a beam failure has occurred. In a case that the beam quality is higher than the worst beam quality indicated by the threshold but is lower than the beam quality required for maintaining high-quality communication, it is considered that the beam is getting worse, that is, the beam quality is poor but the link may work sometimes.

Figure 10:
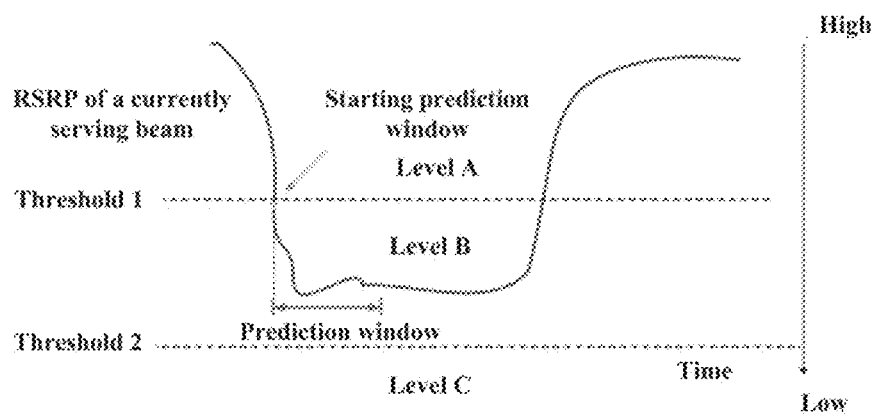
FIG. 10 shows an example of a case in which two thresholds are set.

For example, a particular range is set as a range between two thresholds among the multiple thresholds for beam quality. In a case that the beam quality falls within the particular range, it means that the beam quality is getting worse and the prediction window is started. FIG. 10 shows an example of a case in which two thresholds are set, where the beam quality is represented by RSRP. It should be understood that this is not limitative, and other beam quality indexes may also be adopted. In the example of FIG. 10, the beam quality is divided into three levels by threshold 1 and threshold 2, which are represented by level A, level B and level C. Level A indicates that the quality is the best, and at this level A, reliable communication may be maintained and the user experience is good; level B indicates that the quality is poor, and at this level B, communication where the user experience is poor may be performed; level C indicates that the quality is worst, and at this level C, communication cannot be performed. In a case that the beam quality is reduced to level C, it is considered that a beam failure has occurred. In a case that the beam quality is reduced to level B, the prediction window is started, and the particular range includes an RSRP range corresponding to level B.

Figure 11:
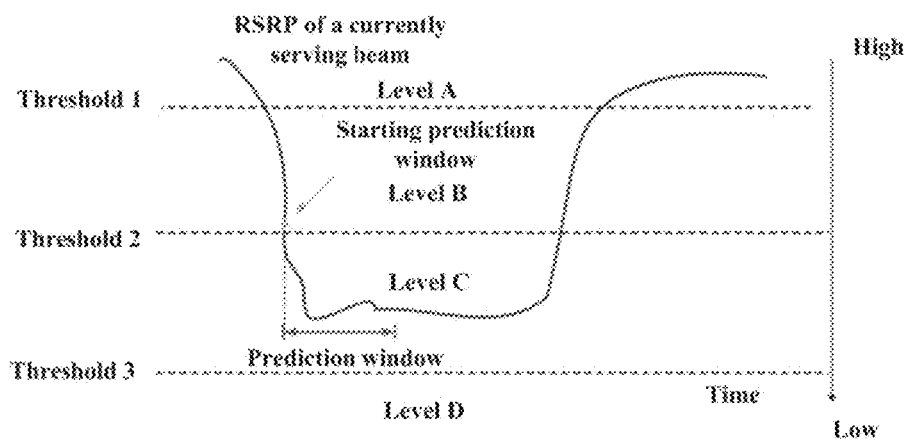
FIG. 11 shows an example of a case in which three thresholds are set.

Furthermore, FIG. 11 shows an example of a case in which three thresholds are set. The beam quality is divided into three levels by threshold 1, threshold 2 and threshold 3. Level A indicates that the quality is best, and at this level A, reliable communication may be maintained and the user experience is good; level B indicates that the quality is relatively good, and at this level B, relatively good quality of communication may also be maintained; level C indicates that the quality is poor, and at this level C, communication where the user experience is poor may be performed; level D indicates that the quality is worst, and at this level D, communication cannot be performed. In a case that the beam quality is reduced to level D, it is considered that a beam failure has occurred. In a case that the beam quality is reduced to level C, the prediction window is started, and the particular range includes an RSRP range corresponding to level C.

In the above example, the two thresholds defining the particular range include the one threshold indicating the worst beam quality among the multiple thresholds. In other words, if the beam quality falls within the particular range, it is indicated that the beam quality is getting worse and there is high possibility of beam failure occurring. Accordingly, the predicting unit 302 continues to evaluate in the prediction window to determine whether the beam deterioration is an accidental event or an indication that beam switching is required.

In an example, the predicting unit 302 is configured to determine, in a case that the number of events of detecting the beam quality to be within the particular range in the prediction window exceeds a predetermined value, that the beam quality of the currently serving beam is poor, and generate a beam switching request such as Beam_Switch_request to be transmitted to a base station, that is, a beam switching procedure is started.

In a case that the beam quality is detected to be within the particular range in one detection, the detection is regarded as an event of detecting a poor beam, and these events are counted in the prediction window. In a case that the counting value exceeds a predetermined value, it is considered that the beam quality is getting quite bad and it is required to switch to a beam with better beam quality to continue communication. It should be noted that in the prediction window, when it is detected that the beam quality falls below the worst beam quality indicated by the threshold (for example, the beam quality falls to the level C in the example of FIG. 10 or falls to the level D in the example of FIG. 11), the predicting unit 302 generates a beam failure recovery request to be transmitted to the base station, that is, a beam failure recovery procedure is started.

Figure 12:
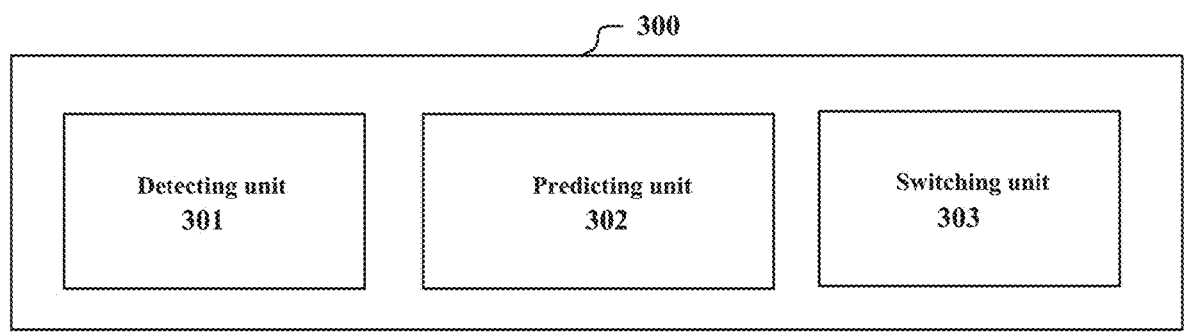
FIG. 12 is a block diagram showing functional modules of an electronic apparatus for wireless communications according to another embodiment of the present disclosure.

Accordingly, FIG. 12 is another block diagram showing functional modules of the electronic apparatus 300. Besides the detecting unit 301 and the predicting unit 302, the electronic apparatus 300 further includes a switching unit 303, configured to perform operations related to beam switching.

For example, the switching unit 303 is configured to detect beam quality of other beams in a case of the predicting unit 302 determining the beam quality of the currently serving beam being poor, to select one or more candidate beams as a switching target, and the predicting unit 302 contains the information about the selected candidate beams in the beam switching request. Furthermore, the beam switching request may further include an identification of the currently serving beam and beam quality information.

For the selection of candidate beams, for example, various standards may be adopted, and these standards may be configured in advanced by the base station. An example of the standard is as follows: the beam quality of the candidate beam is higher than the upper limit of the beam quality indicated by the particular range; and the beam quality of the candidate beam is higher than the beam quality corresponding to the threshold for beam failure detection by a predetermined value.

The switching unit 303 is further configured to start a beam switching window after the beam switching request is transmitted, and monitor a beam switching request response (such as Beam_Switch_request_Response) from a base station in the beam switching window. The beam switching request response includes, for example, one or more of the following: confirmation of the beam switching request; the time to perform the beam switching, that is, the base station and the UE switch to the new beam at the same time after a certain period of time; and information about an ID of the new beam to be switched to, and the like.

Since beam failure does not occur when it is determined to perform beam switching, that is, the currently serving beam is still available, the beam switching request and the beam switching request response may be transmitted on the currently serving beam.

Information about one or more of the various parameters used in the above operations may be obtained via an RRC signaling, for example, such parameters include: multiple thresholds for beam quality; a particular range; a size of a prediction window; the number of events of beam quality being within the particular range; and the number of candidate beams reported in the beam switching request, and the like.

In another example, the predicting unit 302 is configured to perform a predetermined number of times of detections on the beam quality of the currently serving beam in the prediction window, record a detection value of each of multiple detections, and predict whether the currently serving beam fails based on the recorded detection values. The predetermined number of times may be configured by the base station. In this example, the predicting unit 302 observes a change tendency of the beam quality by recording the detection values of multiple detections to predict whether a beam failure will occur.

Figure 13:
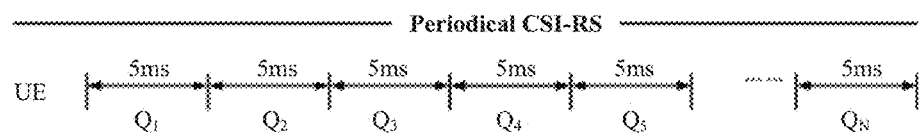
FIG. 13 is a schematic diagram showing N times of detection of beam quality.

FIG. 13 is a schematic diagram showing N times of detection of beam quality. In the example of FIG. 13, the detection value of the beam quality is obtained by measuring the RSRP of the periodical CSI-RS, where the measurement is performed every 5 ms and the detection value of the beam quality is represented by $Q_i$ (i=1, 2, ..., N). It should be understood that this is not restrictive, and the beam quality may also be represented by BLER.

For example, the predicting unit 302 is configured to determine a change tendency of the beam quality of the currently serving beam by comparing the ratio of a subsequent detection value to a previous detection value with a particular parameter, to perform the prediction, where the particular parameter is related to an upper limit and a lower limit of the particular range as well as the predetermined number of times.

Taking FIG. 13 as an example, the predicting unit 302 calculates $$\frac{Q_i}{Q_{i-1}} (i = 1, 2, \ldots, N)$$

and compares the calculated $$\frac{Q_i}{Q_{i-1}}$$

with the particular parameter t.

$$t = \left(\frac{t2}{t1}\right)^{\frac{1}{N-1}},$$

t1 represents an upper limit of the particular range, such as threshold 1 in FIG. 10, and t2 represents a lower limit of the particular range, such as threshold 2 in FIG. 10. The reason is that, if the beam quality continuously decreases from threshold 1 to threshold 2 within N detection periods, the detection values of the beam quality may be treated as a geometric sequence. In a case that the RSRP of the beam in each detection period decreases to t times of the RSRP in the previous detection period, after N periods, the RSRP of the beam will decrease to the threshold 2. Therefore, if $$\frac{Q_i}{Q_{i-1}} \le t,$$

it means that the decrease of the beam quality in the detection period i conforms to the tendency of RSRP decreasing to the threshold 2 within N periods. Furthermore, in order to keep the calculation result accurate even when the beam quality decreases quickly, t may also be set to $$t = \left(\frac{t2 + B}{t1}\right)^{\frac{1}{N-1}}.$$

In this formula, δ represents a fixed value fine-adjusted on the basis of t2, which is positive value in a case that RSRP is used.

The predicting unit 302 is further configured to count comparisons with a consistent change tendency, and predict that the currently serving beam will fail when the counting reaches a predetermined number of times. For example, in the above example, the comparison of $$\frac{Q_i}{Q_{i-1}} \le t$$

would be counted, and in a case that the counting reaches N, it is predicted that the currently serving beam will fail, and a beam failure recovery request may be transmitted to the base station.

Furthermore, it is considered that there may be cases where the change tendency of the beam quality is inconsistent, for example, there is a situation of $$\frac{Q_i}{Q_{i-1}} > t$$

(the beam quality is getting better), and the predicting unit 302 is further configured to adjust the predetermined number of times in a case of the change tendency being inconsistent, and predict that the currently serving beam will fail when the counting reaches the adjusted predetermined number of times. For example, the predicting unit 302 may add the following value to the predetermined number of times to perform adjustment: a difference between a sequence number of the previous detection value corresponding to the comparison with the inconsistent change tendency and a sequence number of a preceding proximity detection value of the previous detection value, wherein the preceding proximity detection value is, in a case that the subsequent detection value corresponding to the comparison with the inconsistent change tendency is contained within a range between the subsequent detection value and the previous detection value for which comparison has been performed, the previous detection value of the subsequent detection value and the previous detection value for which comparison has been performed.

On the other hand, if there is no preceding proximity detection value, it is indicated that the subsequent detection value corresponding to the comparison with the inconsistent change tendency has exceeded the upper limit of the beam quality indicated by the particular range, and the predicting unit 302 will close the prediction window, and does not perform prediction and evaluation on the beam quality any longer.

Figure 14:
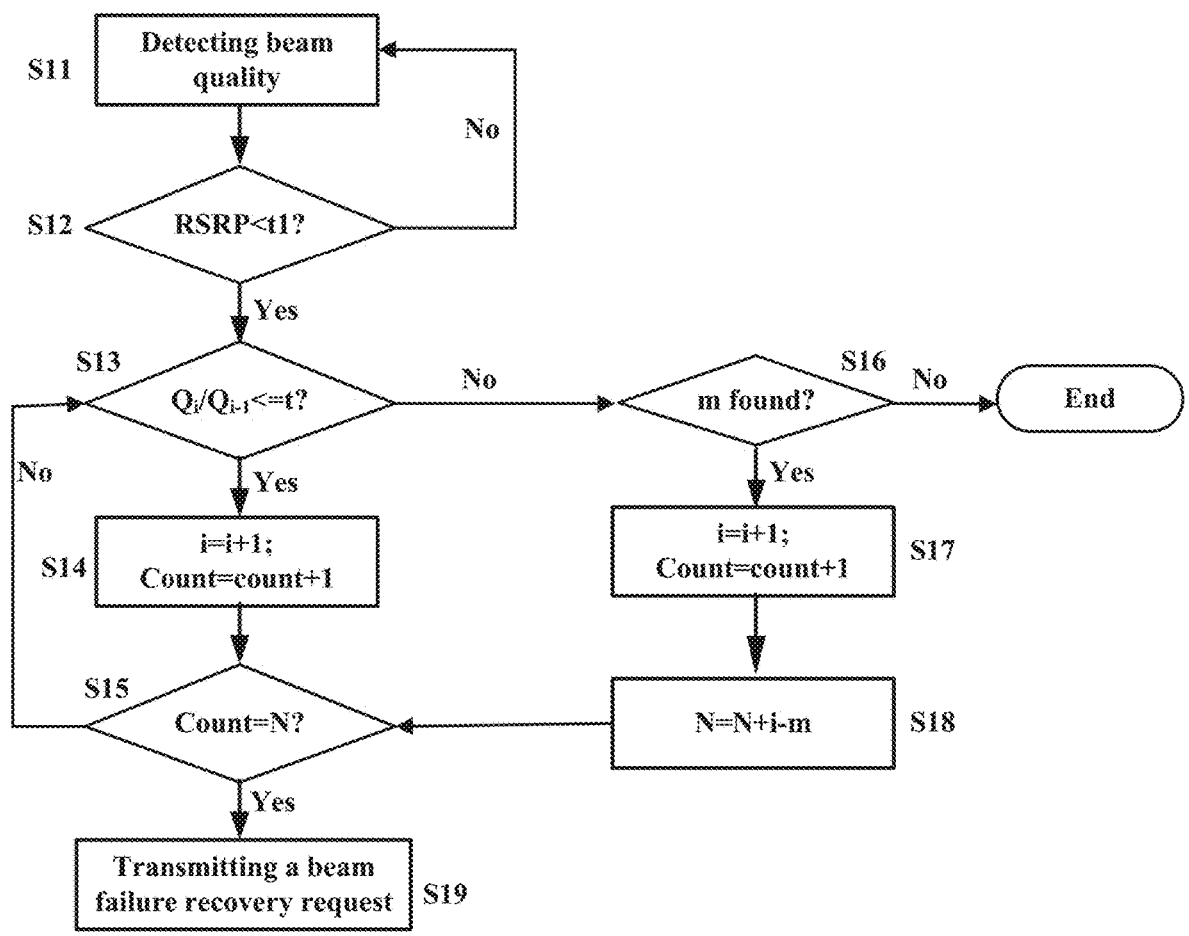
FIG. 14 is a flowchart showing an example of operations performed by a predicting unit.

For ease of understanding, FIG. 14 shows a flowchart of an example of operations performed by the predicting unit in this example. In FIG. 14, the detection value shown in FIG. 13 is still taken as an example. In step S11, beam quality of a currently serving beam is detected, and in step S12, it is determined whether the beam quality falls below the threshold value 1. If it is determined that the beam quality falls below the threshold value 1, the prediction window is started, and the processing proceeds to step S13. In step S13, $$\frac{Q_i}{Q_{i-1}}$$

is calculated and it is determined whether $$\frac{Q_i}{Q_{i-1}} \le t$$

is met, and if it is determined that $$\frac{Q_i}{Q_{i-1}} \le t$$

is met, the processing proceeds to step S14, where the parameter i and count are incremented by 1 respectively (where the initial value of count is 0). Next, the processing proceeds to step S15, and it is determined whether the updated count reaches a predetermined number of times N. If the updated count reaches a predetermined number of times N, it is determined that a beam failure has occurred, and then, the processing proceeds to step S19 to transmit a beam failure recovery request to the base station. If it is determined in step S15 that the updated count does not reach a predetermined number of times N, the processing returns to step S13 to continue counting.

Figure 15:
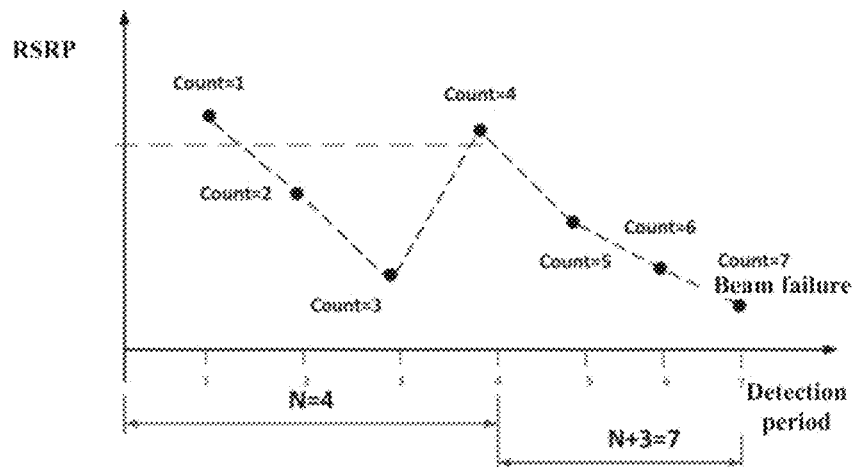
FIG. 15 shows an example of detection values of beam quality.

On the other hand, if it is determined in step S13 that $$\frac{Q_i}{Q_{i-1}} \le t$$

is not met, the processing proceeds to step S16. In step S16, $Q_i$ is compared with the preceding $Q_{i-1}, Q_{i-2}, \ldots Q_1$. If falls between $Q_m$ and $Q_{m+1}$, that is, there is such m, steps S17 and step S18 are performed, where the parameter i and count are incremented by 1, respectively, and N is changed to be N+i−m. FIG. 15 shows an example of a detection value of RSRP in the case that N=4. In FIG. 15, the initial N is equal to 4, $$\frac{Q_i}{Q_{i-1}} \le t$$

is met in the first two comparisons, and in a case that the parameter i is equal to 4, the beam quality suddenly increases to a value between $Q_1$ and $Q_2$. According to the flow with reference to FIG. 14, in this case, m is equal to 1, and thus, N is adjusted to N=4+4−1=7. Then, the subsequent detection values are observed continually, and count=N is determined in a case that count is equal to 7, so as to determine the occurrence of beam failure. It should be understood that when the beam quality repeatedly fluctuates between threshold 1 and threshold 2, N may be adjusted for multiple times. In order to avoid occupying too much cache and computing resources, a maximum value $N_{max}$ may be set for N. In a case that $N>N_{max}$ is met, the prediction window is closed and the procedure ends.

Furthermore, if such m is not found in step S16, it means that $Q_i$ becomes higher than the threshold value 1. In this case, the prediction window is closed, and the procedure ends.

The above description is given by taking RSRP as the beam quality index, and the above description is also applicable to other beam quality indexes such as BLER, and only some comparison rules are required to be adjusted. Furthermore, although not specifically described in this embodiment, as described in the first embodiment and second embodiment, when it is determined that a beam failure occurs, the UE side also needs to perform a selection of candidate beams and contain the related information about the candidate beams in the transmitted beam failure recovery request.

Information about one or more of the various parameters used in the above operations may be obtained via an RRC signaling, such parameters include: multiple thresholds for beam quality; a particular range; a size of a prediction window; the predetermined number of times N of detecting the beam quality in the prediction window; the maximum value of the adjusted predetermined number of times N; the number of candidate beams reported in the beam switching request, and the like.

The electronic apparatus and a method according to this embodiment may pre-evaluate the beam quality of the currently serving beam by setting the prediction window, so as to quickly determine switching operation and recovery operation to be performed, thereby reducing the time delay.

Fourth Embodiment

Figure 16:
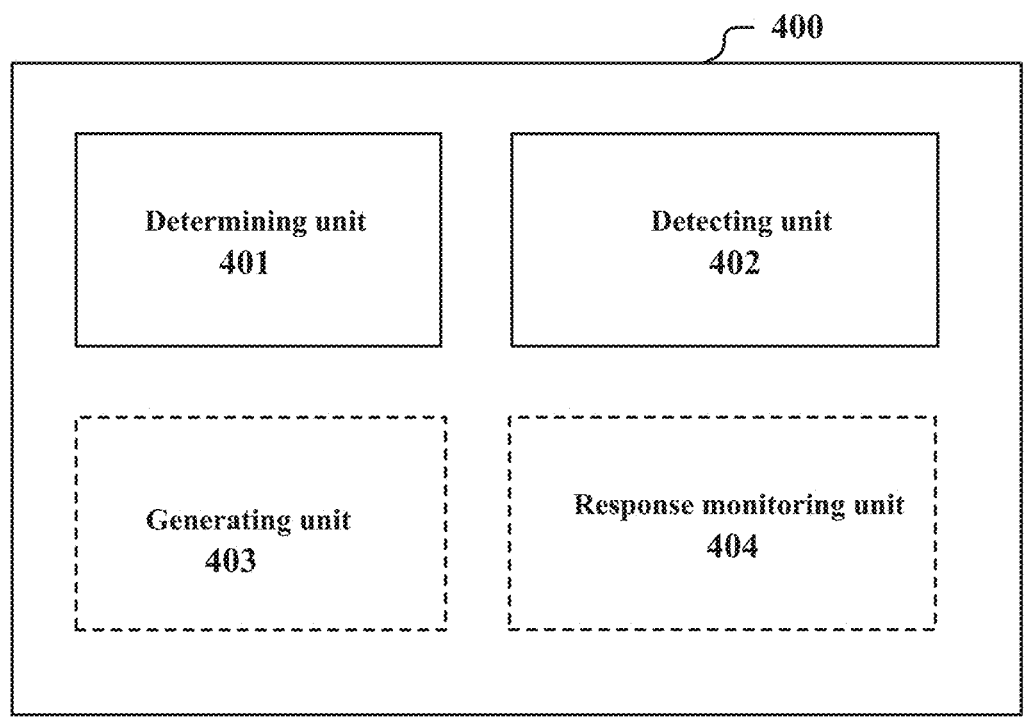
FIG. 16 is a block diagram showing functional modules of an electronic apparatus for wireless communications according to another embodiment of the present disclosure.

FIG. 16 shows a block diagram of functional modules of an electronic apparatus 400 for wireless communications according to an embodiment of the present disclosure. As shown in FIG. 16, the electronic apparatus 400 includes: a determining unit 401, configured to determine, based on information about a tail window contained in a beam failure recovery request response from a base station, a size of the tail window to be opened; and a detecting unit 402, configured to open the tail window and detect beam quality of a new beam in the tail window.

The determining unit 401 and the detecting unit 402 may be implemented by one or more processing circuitries, and the processing circuitries may be implemented, for example, as a chip. It should be noted that, functional units in the apparatus shown in FIG. 16 only represent logic modules divided according to the implemented specific functions, and are not intended to limit the implementations.

The electronic apparatus 400 may be, for example, arranged at user equipment (UE) side, or may be communicatively connected to the UE. Here, it should be noted that the electronic apparatus 400 may be implemented in a chip level or in a device level. For example, the electronic apparatus 400 may function as the UE itself, and may further include external devices such as a memory and a transceiver (not shown in the figure). The memory may be configured to store program and related data information for implementing various functions by the user equipment. The transceiver may include one or more communication interfaces to support communication with various devices (for example a base station, other UE and the like). The implementation of the transceiver is not limited here.

For example, in a scenario in which the UE moves fast or rotates rapidly, the new beam after the beam failure recovery may fail again within a short time period, that is, the beam quality falls below the beam failure detection threshold. In this case, the beam failure recovery mechanism is required to be triggered again, and the UE needs to wait for the same long beam recovery time delay, which will result in poor user experience.

In this embodiment, the concept of a tail window is proposed. Specifically, in a case that the beam recovery is successful, for example, the beam quality of the new beam reaches a level at which the new beam may operate normally, the new beam is still monitored for a period of time, which is referred to as a tail window. If a beam failure occurs again in the tail window, a quicker beam recovery mechanism will be triggered.

For example, as shown by a dashed line block in FIG. 16, the electronic apparatus 400 further includes: a generating unit 403, configured to generate a beam failure recovery request when the number of times of detecting that beam quality of a currently serving beam is lower than a predetermined threshold exceeds a first number of times; and generate a new beam failure recovery request when the number of times of detecting that the beam quality of the new beam is lower than a predetermined threshold exceeds a second number of times in the tail window, wherein the first number of times is greater than the second number of times.

As described above, in the beam failure detection, if M events that beam quality is lower than a predetermined threshold are continuously detected, it is considered that a beam failure has occurred, thereby generating a beam failure recovery request. The generating unit 401 sets a different M for the case in which the beam failure occurs for the first time and for the case in which the beam failure occurs again in the tail window after the beam failure recovery, where a smaller M is set for the case in which the beam failure occurs again in the tail window, thereby reducing the time delay of beam recovery in the case of the beam failure occurring frequently. It should be understood that when beam failure recovery occurs consecutively for multiple times, M may be reduced for each time, that is, M used for the subsequent beam failure detection is smaller than M used for the previous beam failure detection until the specified minimum value of M is reached.

Alternatively/additionally, as shown by another dashed line block in FIG. 16, the electronic apparatus 400 further includes a response monitoring unit 404, configured to open a beam failure recovery window with a first size after the beam failure recovery request is transmitted, to wait for the beam failure recovery request response; and open a beam failure recovery window with a second size after the new beam failure recovery request is transmitted, to wait for the beam failure recovery request response, wherein the first size is greater than the second size.

As described above, after transmitting a beam failure recovery request to the base station, the UE monitors the response from the base station within a certain period of time, which may be referred to as a beam failure recovery window. The response monitoring unit 404 opens beam failure recovery windows with different sizes for the case in which the beam failure occurs for a first time and for the case in which the beam failure occurs again in the tail window, where a beam failure recovery window with a smaller size is opened for the case in which the beam failure occurs again in the tail window, thereby reducing the time delay of beam recovery in the case of the beam failure occurring frequently. The first size and the second size can be in units of slot, and the first size and the second size may be set by the base station. It should be understood that when beam failure recovery occurs consecutively for multiple times, the size of the beam failure recovery window may be reduced for each time, that is, the size of the beam failure recovery window used for the subsequent beam failure recovery is smaller than the size of the beam failure recovery window used for the previous beam failure recovery, until the specified minimum value of the size of the beam failure recovery window is reached.

Figure 17:
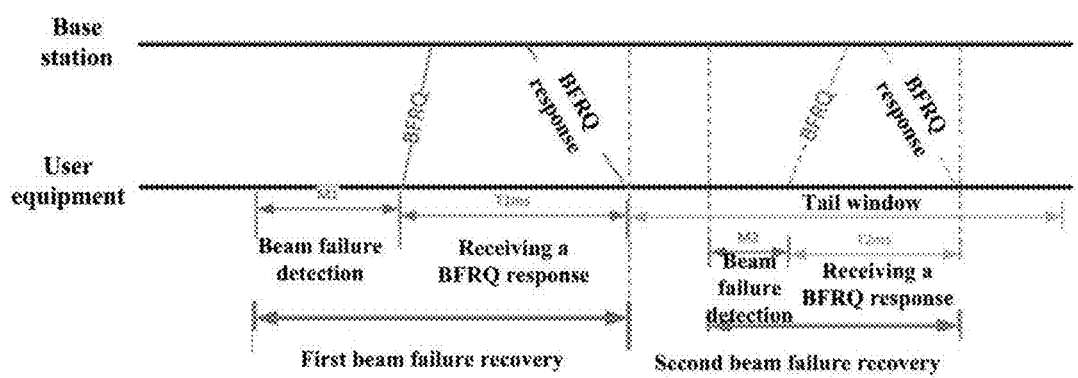
FIG. 17 shows an example of a tail window.

For ease of understanding, FIG. 17 shows an example of a tail window. In the first time of beam failure recovery, in a phase of beam failure detection, it is considered that beam failure has occurred in a case that M1 consecutive beam failure events are detected, and a beam failure recovery request (BFRQ) is transmitted to the base station, and then, a BFRQ response is monitored and received from the base station in a beam failure recovery window with a size of T1 ms. After a new beam operates normally, the tail window is opened, and a second time of beam failure recovery occurs in the tail window. In the second beam failure recovery, in a case that M2 consecutive beam failure events are detected in the phase of the beam failure detection, it is considered that beam failure occurs and a BFRQ is transmitted to the base station, where M2<M1. Furthermore, the size of the beam failure recovery window used to monitor and receive the BFRQ response from the base station is also reduced to T2 ms, where T2<T1. Although not shown in FIG. 17, it should be understood that after the second beam failure recovery is completed, the tail window may be continued to be opened, and M2 and T2 are further reduced.

Figure 18:
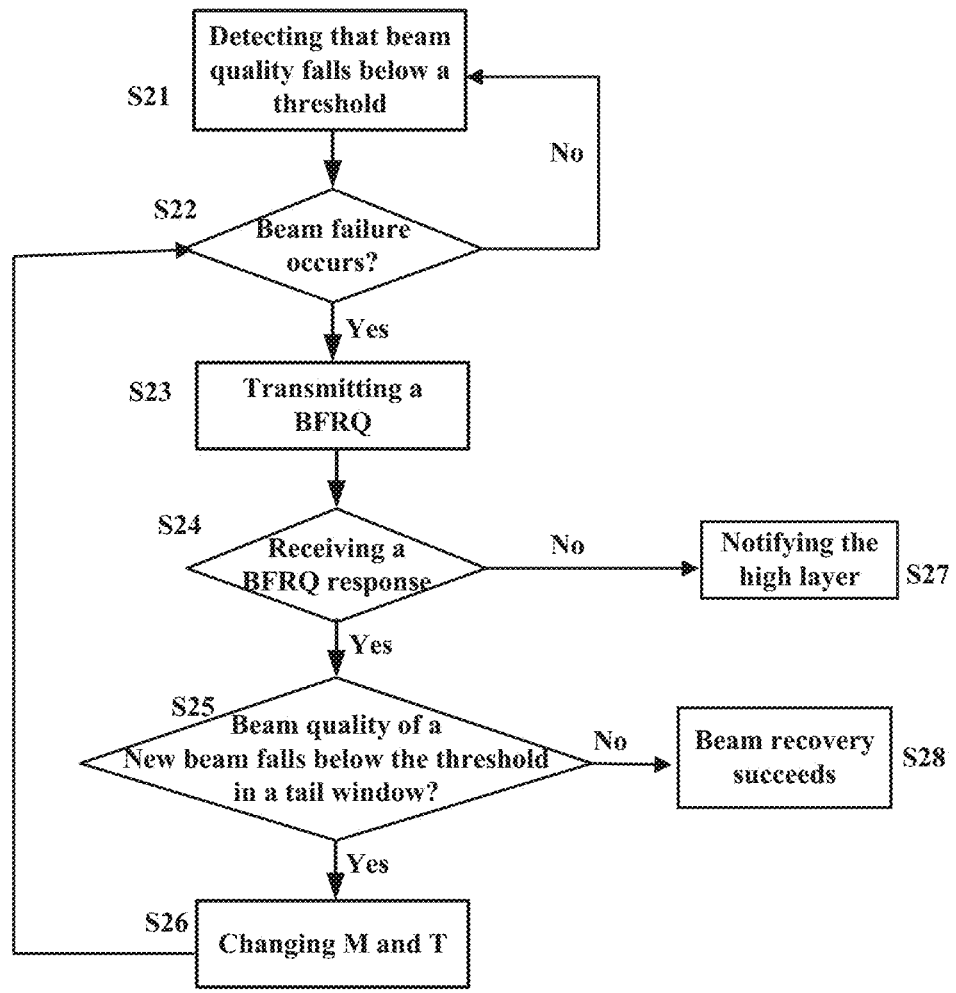
FIG. 18 is a schematic flowchart showing a tail window mechanism according to the present disclosure.

Accordingly, FIG. 18 shows a schematic flowchart of a tail window mechanism of this embodiment. UE detects beam quality and determines that the beam quality falls below a threshold in step S21, and then, in step S22, the UE determines whether beam failure occurs, that is, whether the number of beam failure events exceeds the maximum number M of beam failure events. If it is determined that the number of beam failure events does not exceed the maximum number M of beam failure events, the processing returns to step S21 to continue the detection, otherwise, the processing proceeds to step S23 to transmit a BFRQ to the base station. Next, in step S24, it is determined whether a BFRQ response from the base station is received in the beam failure recovery window. If the BFRQ response from the base station is not received, the processing proceeds to step S27 to notify the higher layer to perform additional processing. If the BFRQ response is received, the processing proceeds to step S25, and in step S25, the tail window is opened and it is monitored in the tail window whether the beam quality of the new beam falls below the threshold. If the beam quality of the new beam does not fall below the threshold, the processing proceeds to step S28 and the beam recovery is successful. If the beam quality of the new beam falls below the threshold, the maximum number M of beam failure events and the size T of the beam failure recovery window in beam failure detection are changed, and the processing returns to step S22 to perform beam failure detection. Then, the following steps are repeated.

Furthermore, in an example, the generating unit 403 is further configured to generate a tail window opening request (such as Open_Tail_Window_Request) to be transmitted to the base station simultaneously with the beam failure recovery request. That is, the setting information of the tail window may be transmitted in response to the request of the UE. Accordingly, the information about the tail window from the base station may include, for example, one or more of the following: an indication of opening the tail window; the size of the tail window; the maximum number of beam failure events; the size of the beam failure recovery window in the tail window, and the like.

The electronic apparatus and the method according to the aspect of the present disclosure may quickly perform beam recovery in a case that the new beam fails again by detecting the beam quality of the new beam in the tail window, thereby reducing the time delay.

Fifth Embodiment

Figure 19:
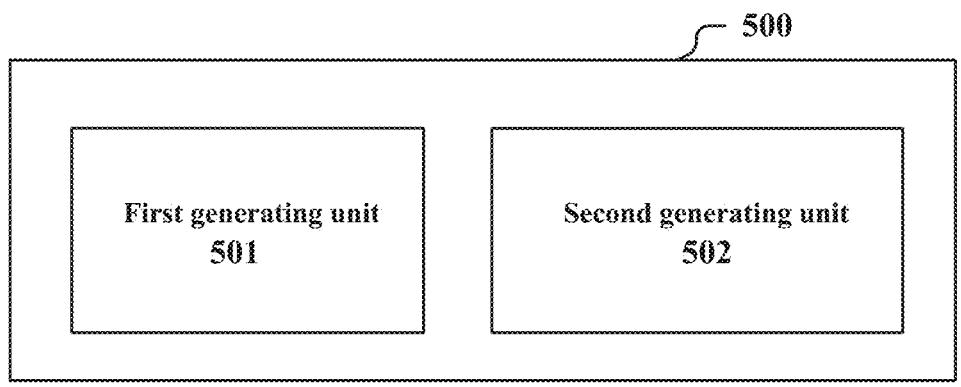
FIG. 19 is a block diagram showing functional modules of an electronic apparatus for wireless communications according to another embodiment of the present disclosure.

FIG. 19 is a block diagram showing functional modules of an electronic apparatus 500 for wireless communications according to another embodiment of the present disclosure. As shown in FIG. 19, the electronic apparatus 500 includes: a first generating unit 501, configured to generate configuration for beam failure recovery operation of user equipment and contain the configuration in a radio resource control signaling to be provided to the user equipment; and a second generating unit 502, configured to generate a beam failure recovery request response in response to a beam failure recovery request from the user equipment, where the configuration includes one or more of the following: multiple beam quality thresholds for beam quality evaluation, a first beam quality threshold and a second beam quality threshold for candidate beam selection, a duration of a timer for candidate beam selection, a size of a prediction window for beam quality evaluation.

The first generating unit 501 and the second generating unit 502 may be implemented by one or more processing circuitries, and the processing circuitries may be implemented, for example, as a chip. It should be noted that, functional units in the apparatus shown in FIG. 19 only represent logic modules divided according to the implemented specific functions, and are not intended to limit the implementations.

The electronic apparatus 500 may be, for example, arranged at a base station side, or may be communicatively connected to the base station. Here, it should be noted that the electronic apparatus 500 may be implemented in a chip level or in a device level. For example, the electronic apparatus 500 may functions as the base station itself, and may further include external devices such as a memory and a transceiver (not shown in the figure). The memory may be configured to store program and related data information for implementing various functions by the base station. The transceiver may include one or more communication interfaces to support communication with various devices (for example, user equipment, other base stations and the like). The implementation of the transceiver is not limited here.

The electronic apparatus 500 according to this embodiment may provide an RRC configuration signaling and a beam failure recovery request (BFRQ) response corresponding to one or more of the electronic apparatuses 100 to 400 according to the foregoing embodiments. The configuration of the RRC regarding the beam failure recovery operation has been described in detail in the first embodiment to the fourth embodiment, which is not repeated here.

Furthermore, the second generating unit 502 is further configured to generate a beam switching request response for a beam switching request from the user equipment. The beam switching request response includes, for example, confirmation of the beam switching request or information about an ID of the new beam to be switched to.

The second generating unit 502 may also include information about a size of a tail window in the beam failure recovery request response, and the user equipment detects beam quality of a new beam in the tail window.

The electronic apparatus and the method according to this embodiment may achieve high-efficiency, low-latency beam failure recovery by configuring the beam failure recovery operation of the user equipment.

Figure 20:
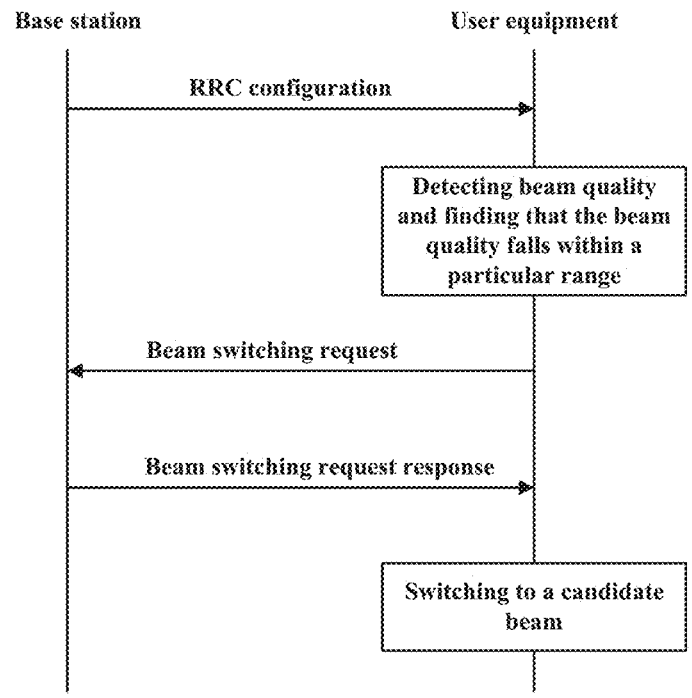
FIG. 20 shows an example of an information procedure between a base station and user equipment.

For ease of understanding, FIG. 20 shows an information procedure for beam switching between a base station and user equipment As shown in FIG. 20, first, the base station transmits an RRC configuration to the user equipment. The RRC configuration may include a size of a prediction window related to beam switching, the setting of multiple thresholds and the like. The UE performs detecting on the beam quality based on the configuration and determines that the beam quality falls within a particular range defined by the thresholds. In this case, the UE opens a prediction window. If it is detected that a beam becomes a poor beam in the prediction window, a beam switching request is transmitted to the base station. The beam switching request may include information about a candidate beam as a switching target such as an ID and beam quality thereof, and may also include an ID and beam quality of the current poor beam. In response to the beam switching request, the base station transmits a beam switching request response to the user equipment, which includes confirmation of the beam switching request. The user equipment switches to the candidate beam based on the beam switching request response.

Figure 21:
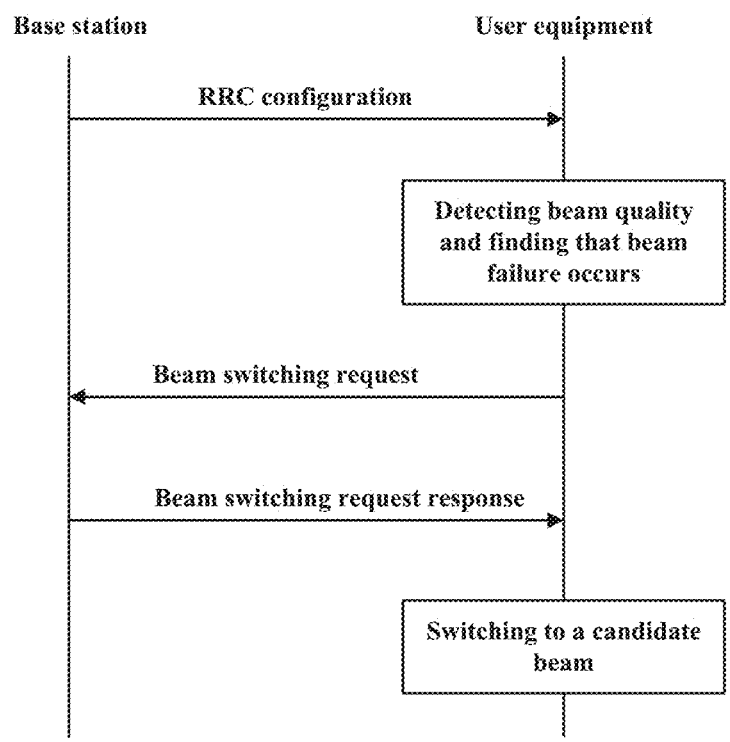
FIG. 21 shows another example of an information procedure between a base station and user equipment.

In contrast, FIG. 21 shows an information procedure for beam recovery between a base station and user equipment. As shown in FIG. 21, first, the base station transmits an RRC configuration to the user equipment. The RRC configuration may include parameters related to beam failure detection, parameters related to selection of candidate beams, and may also include the above parameters related to beam switching. The UE performs detecting on the beam quality based on this configuration and determines that beam failure occurs or predicts that beam failure will occur (for example, adopting the scheme in the third embodiment). In this case, the UE transmits a beam failure recovery request to the base station, which may include information about candidate beam such as an ID and beam quality thereof and the like. In response to the beam failure recovery request, the base station transmits a beam failure recovery request response to the user equipment, which includes confirmation of the beam failure recovery request. The user equipment switches to the candidate beam based on the beam failure recovery request response.

Figure 22:
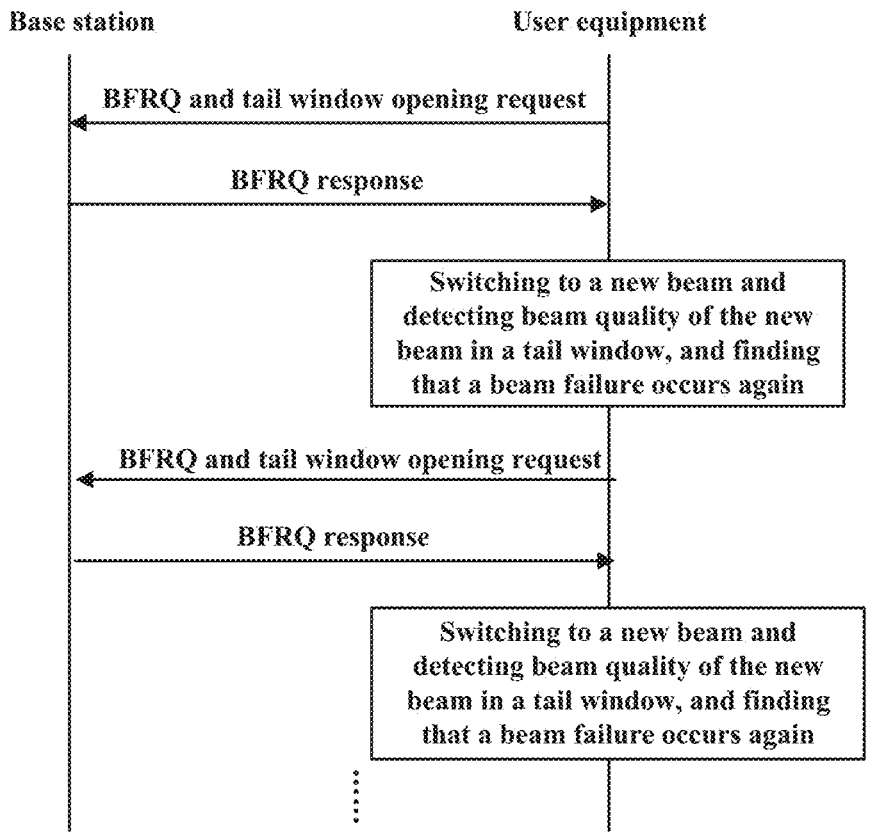
FIG. 22 shows another example of an information procedure between a base station and user equipment.

Furthermore, FIG. 22 also shows a diagram of an example of an information procedure between the base station and the user equipment in the case that a tail window is provided. The user equipment also transmits a tail window opening request to the base station when transmitting the BFRQ, and the base station transmits a BFRQ response to the user equipment in response to these requests. The user equipment switches to a new beam, and detects beam quality of the new beam in the tail window. If it is determined that the beam failure occurs again, the user equipment transmits a BFRQ and a tail window opening request, and receives a BFRQ response from the base station. The processing is performed repetitively.

It should be noted that the information procedures in FIGS. 20 to 22 are only schematic and do not limit the present disclosure.

Sixth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 23:
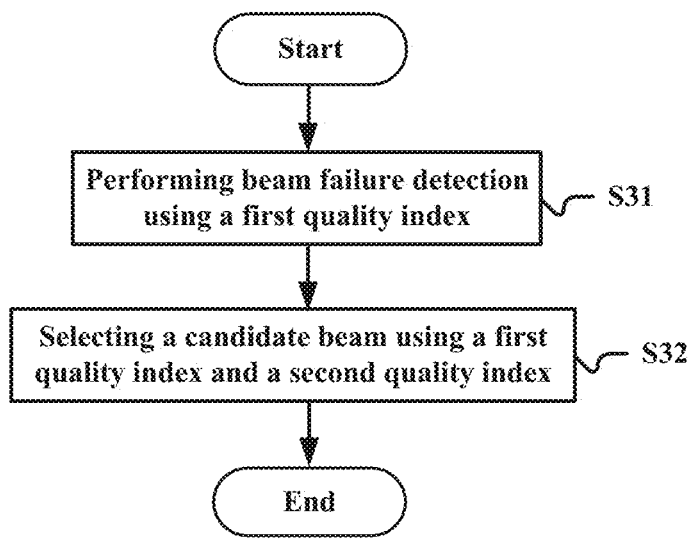
FIG. 23 is a flowchart showing a method for wireless communications according to an embodiment of the present disclosure.

FIG. 23 is a flowchart showing a method for wireless communications according to an embodiment of the present disclosure. The method includes: performing beam failure detection on a currently serving beam using a first quality index of a beam (S31); and selecting a candidate beam from among other beams using the first quality index of the beam and a second quality index of the beam which is different from the first quality index, the candidate beam being used for beam recovery after beam failure (S32).

This method adopts two quality indexes in a case of selecting candidate beams, such that in a case that the beam quality index used for beam failure detecting and the beam quality index used for candidate beam selecting are different, a ping-pong effect is avoided, thereby reducing the time delay of beam failure recovery. This method corresponds to the apparatus 100 described in the first embodiment. For specific details, one may refer to the above corresponding description, and details are not repeated here.

Figure 24:
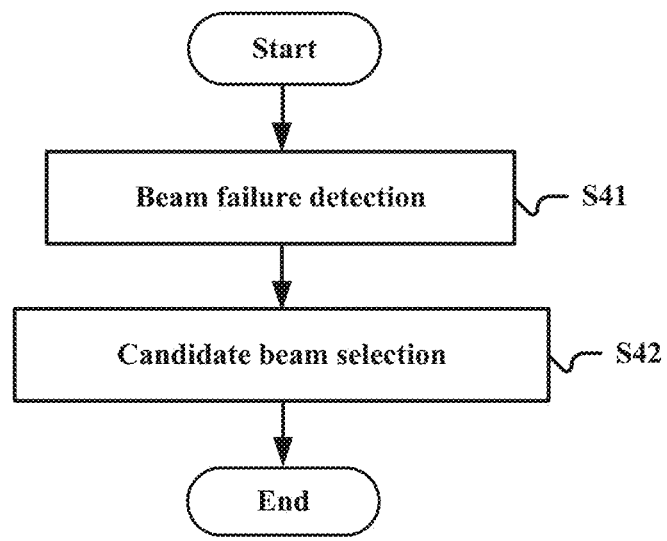
FIG. 24 is a flowchart showing a method for wireless communications according to another embodiment of the present disclosure.

FIG. 24 shows a method for wireless communications according to another embodiment of the present disclosure. The method includes: performing detecting on beam quality of a currently serving beam, and determining that a beam failure occurs in a case of the beam quality being lower than a first quality (S41); and in a case of the beam failure occurring, performing detecting on beam quality of another beam, and taking the beam as a candidate beam in a case of the beam quality being higher than a second quality (S42), where the second quality is higher than the first quality.

This method may avoid the occurrence of ping-pong effect by appropriately increasing the threshold for beam quality in a case of selecting candidate beams, thereby reducing the time delay of beam failure recovery. This method corresponds to the apparatus 200 described in the second embodiment. For specific details, one may refer to the above corresponding description, and details are not repeated here.

Figure 25:
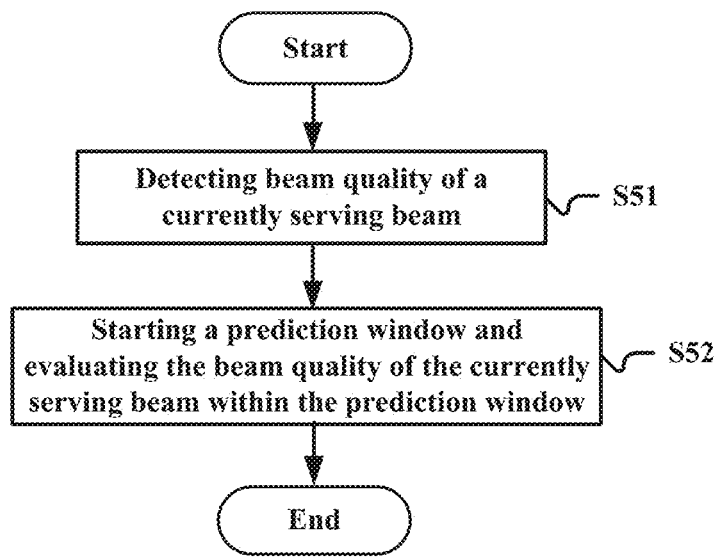
FIG. 25 is a flowchart showing a method for wireless communications according to another embodiment of the present disclosure.

FIG. 25 shows a method for wireless communications according to another embodiment of the present disclosure. The method includes: detecting beam quality of a currently serving beam (S51); and starting a prediction window when the detected beam quality is within a particular range, and evaluating the beam quality of the currently serving beam within the prediction window (S52).

This method may predict a beam failure which may occur in a case that the beam quality of the serving beam falls to a certain degree by setting a prediction window, so as to timely perform beam switching or beam recovery, thereby reducing the time delay. This method corresponds to the apparatus 300 described in the third embodiment. For specific details, one may refer to the above corresponding description, and details are not repeated here.

Figure 26:
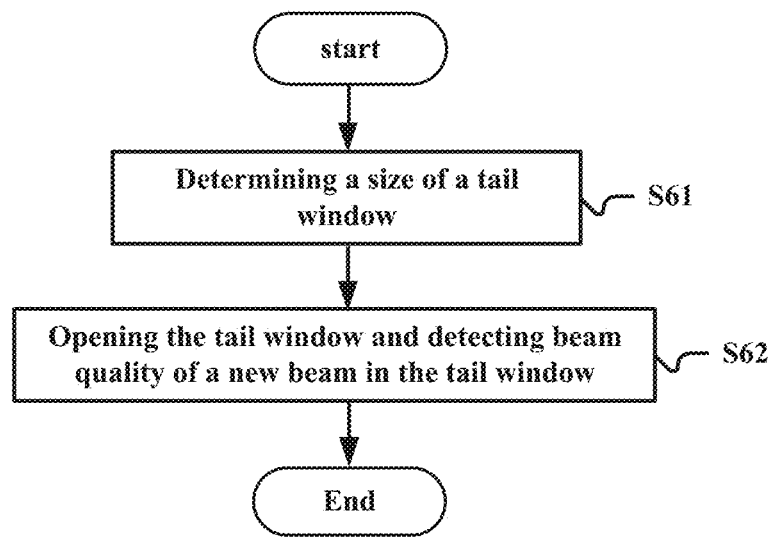
FIG. 26 is a flowchart showing a method for wireless communications according to another embodiment of the present disclosure.

FIG. 26 shows a method for wireless communications according to another embodiment of the present disclosure. The method includes: determining, based on information about a tail window contained in a beam failure recovery request response from a base station, a size of the tail window to be opened (S61); and opening the tail window and detecting beam quality of the new beam in the tail window (S62).

This method implements quick recovery of beam failures which occurs frequently by setting a tail window, thereby reducing the time delay. This method corresponds to the apparatus 400 described in the fourth embodiment. For specific details, one may refer to the above corresponding description, and details are not repeated here.

Figure 27:
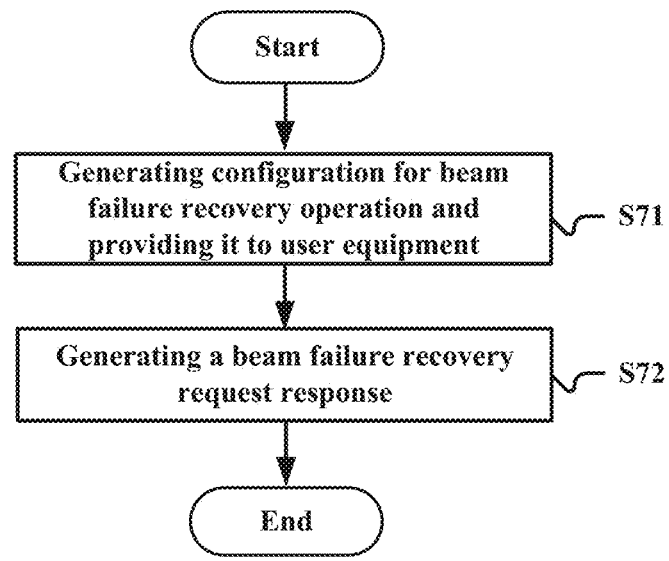
FIG. 27 is a flowchart showing a method for wireless communications according to another embodiment of the present disclosure.

FIG. 27 shows a method for wireless communications according to another embodiment of the present disclosure. The method includes: generating a configuration for beam failure recovery operation of user equipment and containing the configuration in an RRC signaling to be provided to the user equipment (S71); and generating a beam failure recovery request response in response to a beam failure recovery request from the user equipment (S72), where the configuration includes one or more of the following: multiple beam quality thresholds for beam quality evaluation, a first beam quality threshold and a second beam quality threshold for candidate beam selection, a duration of a timer for candidate beam selection, a size of a prediction window for beam quality evaluation.

This method may achieve high-efficiency, low-latency beam failure recovery by configuring the beam failure recovery operation of the user equipment. This method corresponds to the apparatus 500 described in the fifth embodiment. For specific details, one may refer to the above corresponding description, and details are not repeated here.

It should be noted that the above methods may be performed in combination or separately.

The technology according to the present disclosure is applicable to various products.

For example, the electronic apparatus 500 may be implemented as various base stations. The base station may be implemented as any type of evolution Node B (eNB) or gNB (which is a 5G base station). The eNB includes, for example, a macro eNB and a small eNB. The small eNB may be an eNB that covers a cell smaller than a macro cell, such as a pico eNB, a micro eNB and a home (femto) eNB. The case for the gNB is similar to the above. Alternatively, the base station may be implemented as any other type of base station, such as a NodeB and a base transceiver station (BTS). The base station may include a body (also referred to as a base station device) configured to control wireless communications; and one or more remote radio heads (RRH) arranged in a different position from the body. In addition, various types of user equipments may each operate as the base station by temporarily or semi-persistently executing a base station function.

Any one of the electronic apparatuses 100 to 400 may be implemented as various user equipments. The user equipment may be implemented as a mobile terminal (such as a smartphone, a tablet personal computer (PC), a notebook PC, a portable game terminal, a portable/dongle type mobile router, and a digital camera device), or an in-vehicle terminal (such as a vehicle navigation device). The user equipment may also be implemented as a terminal that performs machine-to-machine (M2M) communication (which is also referred to as a machine type communication (MTC) terminal). Furthermore, the user equipment may be a wireless communication module (such as an integrated circuit module including a single chip) mounted on each of the above terminals.

Application Example Regarding a Base Station

First Application Example

Figure 28:
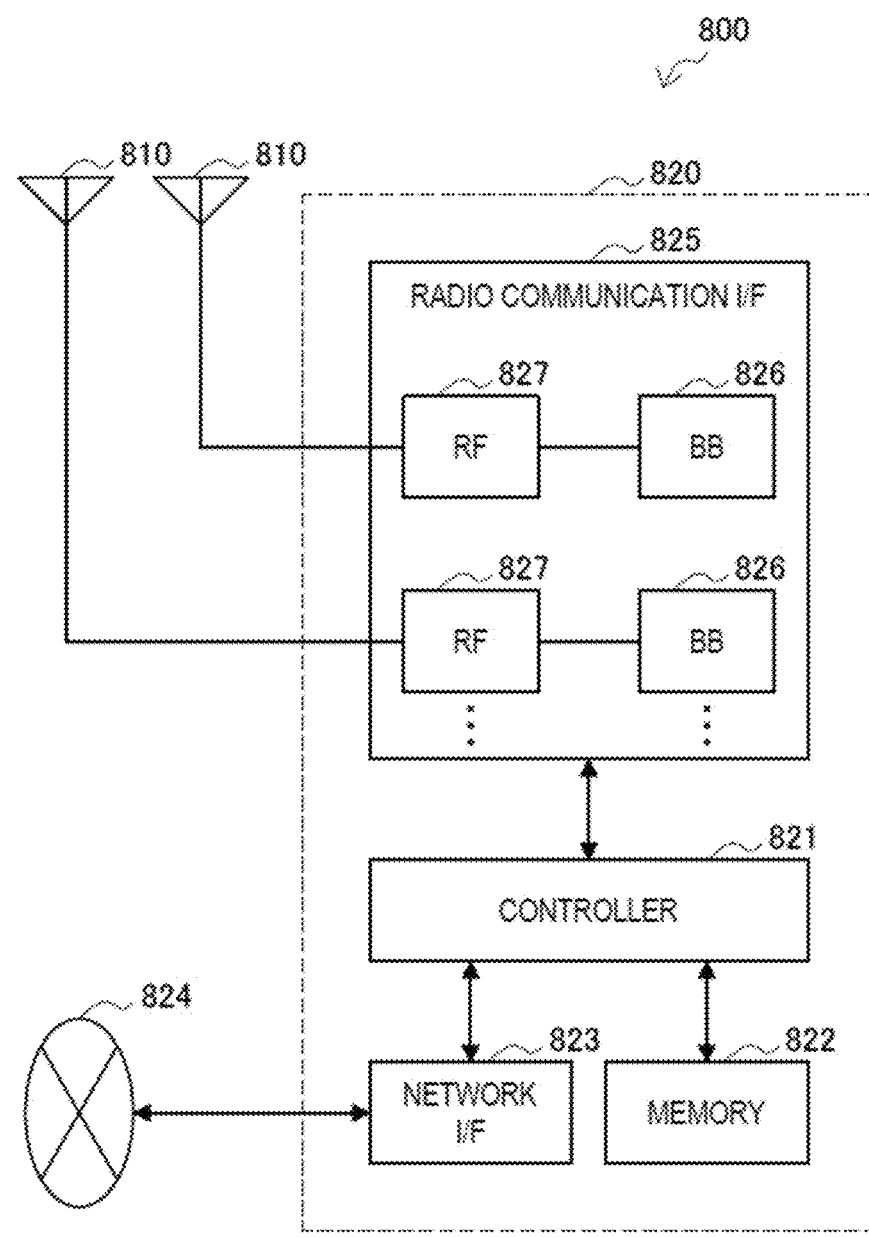
FIG. 28 is a block diagram showing a first example of a schematic configuration of an eNB or a gNB to which the technology of the present disclosure may be applied.

FIG. 28 is a block diagram showing a first example of a schematic configuration of an eNB or a gNB to which the technology of the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 28, the eNB 800 may include the multiple antennas 810. For example, the multiple antennas 810 may be compatible with multiple frequency bands used by the eNB 800. Although FIG. 28 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 28, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 28. For example, the multiple RF circuits 827 may be compatible with multiple antenna elements. Although FIG. 28 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 28, the transceiver of the electronic apparatus 500 may be implemented by the radio communication interface 825. At least a part of the functions may also be implemented by the controller 821. For example, the controller 821 may generate an RRC signaling for the user equipment which includes configuration for a beam failure recovery operation and generate a BFRQ response, by performing functions of the first generating unit 501 and the second generating unit 502.

Second Application Example

Figure 29:
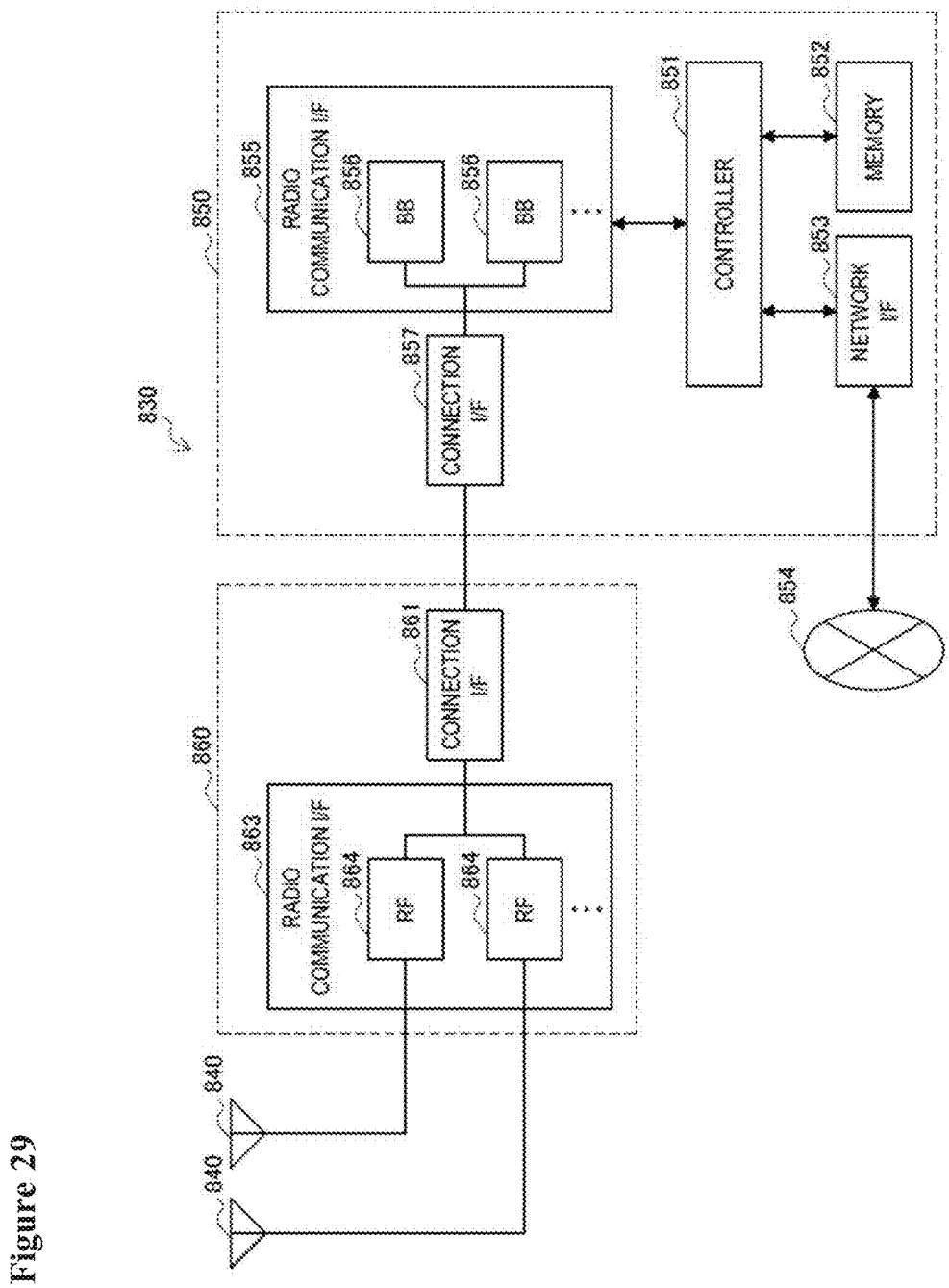
FIG. 29 is a block diagram showing a second example of a schematic configuration of an eNB or a gNB to which the technology of the present disclosure may be applied.

FIG. 29 is a block diagram showing a second example of a schematic configuration of an eNB or a gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 29, the eNB 830 may include the multiple antennas 840. For example, the multiple antennas 840 may be compatible with multiple frequency bands used by the eNB 830. Although FIG. 29 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 28.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 28, except that the BB processor 856 is connected to an RF circuit 864 of the RRH 860 via the connection interface 857. As show in FIG. 29, the radio communication interface 855 may include the multiple BB processors 856. For example, the multiple BB processors 856 may be compatible with multiple frequency bands used by the eNB 830. Although FIG. 29 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 29. For example, the multiple RF circuits 864 may support multiple antenna elements. Although FIG. 29 shows the example in which the radio communication interface 863 includes the multiple RF circuits 864, the radio communication interface 863 may also include a single RF circuit 864.

In the eNB 830 shown in FIG. 29, the transceiver of the electronic apparatus 500 may be implemented by the radio communication interface 825. At least a part of the functions may also be implemented by the controller 821. For example, the controller 821 may generate an RRC signaling for the user equipment which includes configuration for a beam failure recovery operation and generate a BFRQ response, by performing functions of the first generating unit 501 and the second generating unit 502.

Application Example Regarding User Equipment

First Application Example

Figure 30:
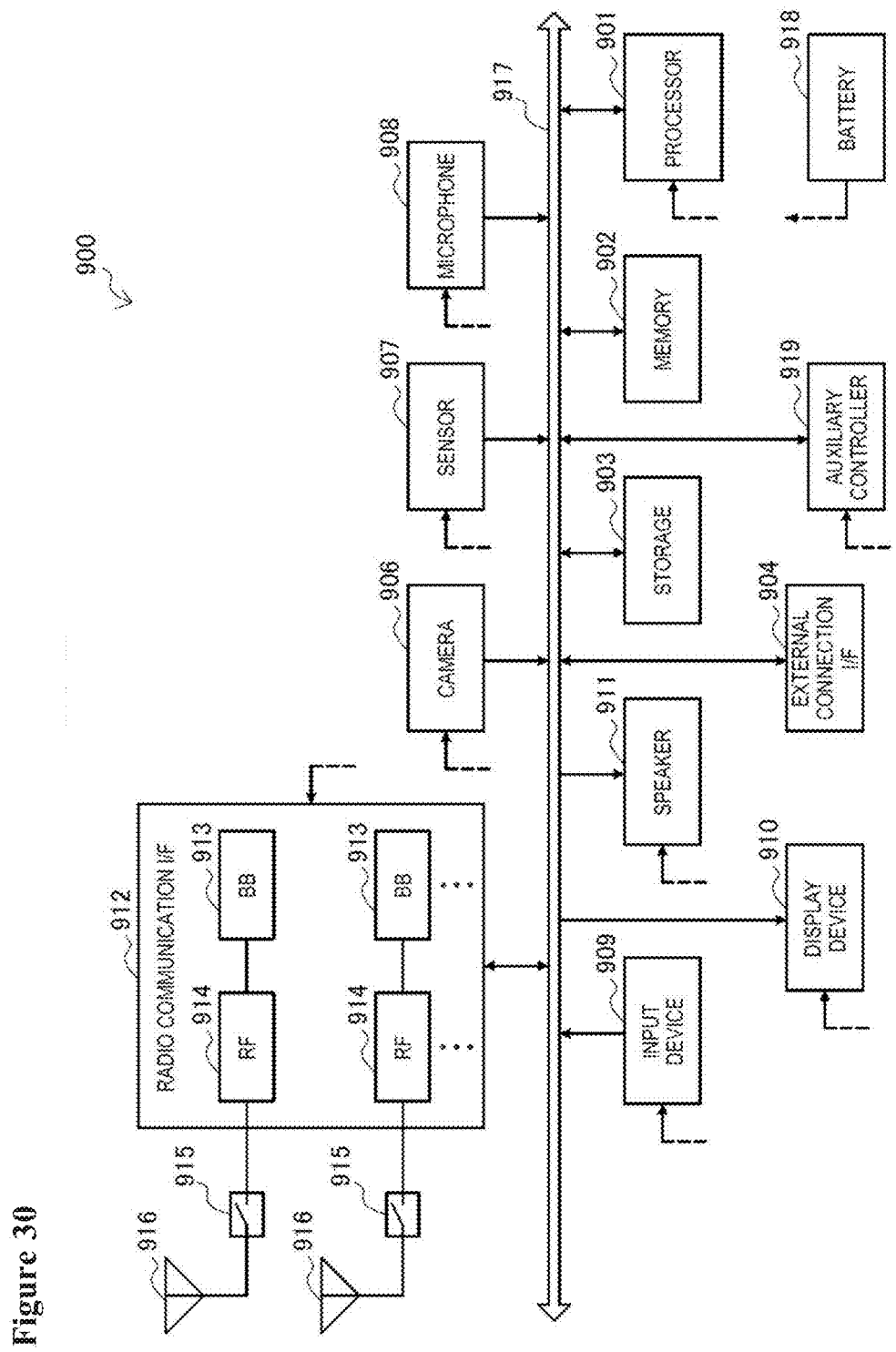
FIG. 30 is a block diagram showing an example of a schematic configuration of a smartphone to which the technology according to the present disclosure may be applied.

FIG. 30 is a block diagram illustrating an example of exemplary configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 30 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 30. Although FIG. 30 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 30. Although FIG. 30 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 30 via feeder lines that are partially shown as dashed lines in FIG. 30. The auxiliary controller 919, operates a minimum necessary function of the smart phone 900, for example, in a sleep mode.

In the smartphone 900 shown in FIG. 30, the transceiver of the electronic apparatuses 100 to 400 may be implemented by the radio communication interface 912. At least a part of the functions may be implemented by the processor 901 or the auxiliary controller 919. For example, the controller 901 or the auxiliary controller 919 may implement beam failure detection and selection of candidate beams by performing functions of the beam failure detecting unit 101 and the selecting unit 102, to avoid ping-pong effect. The controller 901 or the auxiliary controller 919 may take a beam with a high beam quality as a candidate beam by performing functions of the first detecting unit 201 and the second detecting unit 202. The controller 901 or the auxiliary controller 919 may implement a prediction of beam failure and a beam switching by performing functions of the detecting unit 301, the predicting unit 302 and the switching unit 303. The controller 901 or the auxiliary controller 919 may implement a tail window mechanism by performing functions of the determining unit 401, the detecting unit 402, the generating unit 403 and the response monitoring unit 404.

Second Application Example

Figure 31:
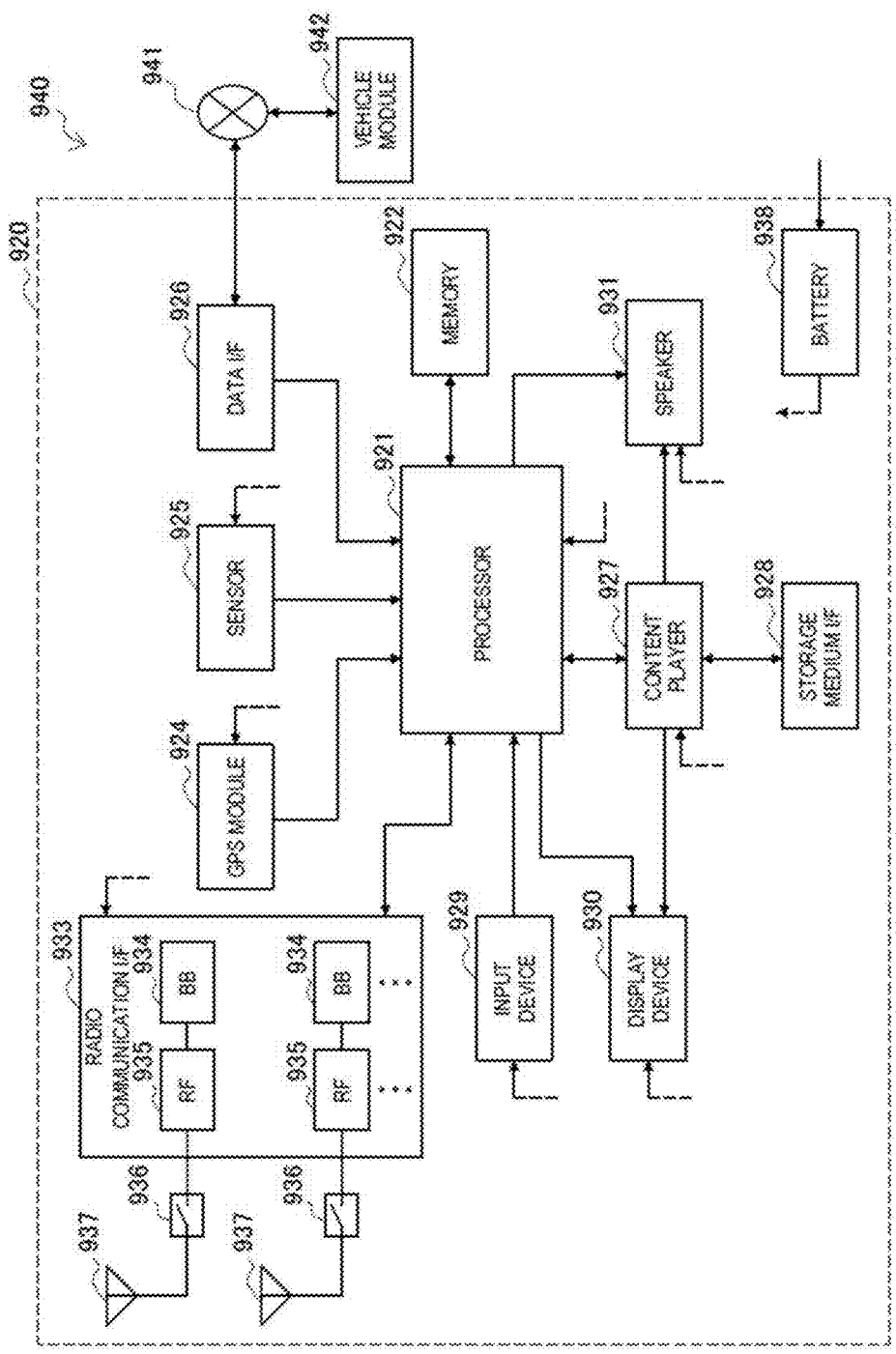
FIG. 31 is a block diagram showing an example of a schematic configuration of a car navigation apparatus to which the technology according to the present disclosure may be applied.

FIG. 31 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 31. Although FIG. 31 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 31, the car navigation apparatus 920 may include the multiple antennas 937. Although FIG. 31 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 31 via feeder lines that are partially shown as dash lines in FIG. 31. The battery 938 accumulates power supplied from the vehicle.

In the car navigation apparatus 920 shown in FIG. 31, the transceiver of the electronic apparatuses 100 to 400 may be implemented by the radio communication interface 912. At least a part of the functions may be implemented by the processor 901 or the auxiliary controller 919. For example, the controller 901 or the auxiliary controller 919 may implement beam failure detection and selection of candidate beams by performing functions of the beam failure detecting unit 101 and the selecting unit 102, to avoid ping-pong effect. The controller 901 or the auxiliary controller 919 may take a beam with a high beam quality as a candidate beam by performing functions of the first detecting unit 201 and the second detecting unit 202. The controller 901 or the auxiliary controller 919 may implement a prediction of beam failure and a beam switching by performing functions of the detecting unit 301, the predicting unit 302 and the switching unit 303. The controller 901 or the auxiliary controller 919 may implement a tail window mechanism by performing functions of the determining unit 401, the detecting unit 402, the generating unit 403 and the response monitoring unit 404.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 3200 shown in FIG. 32) from a storage medium or network, wherein the computer is capable of implementing various functions when installed with various programs.

Figure 32:
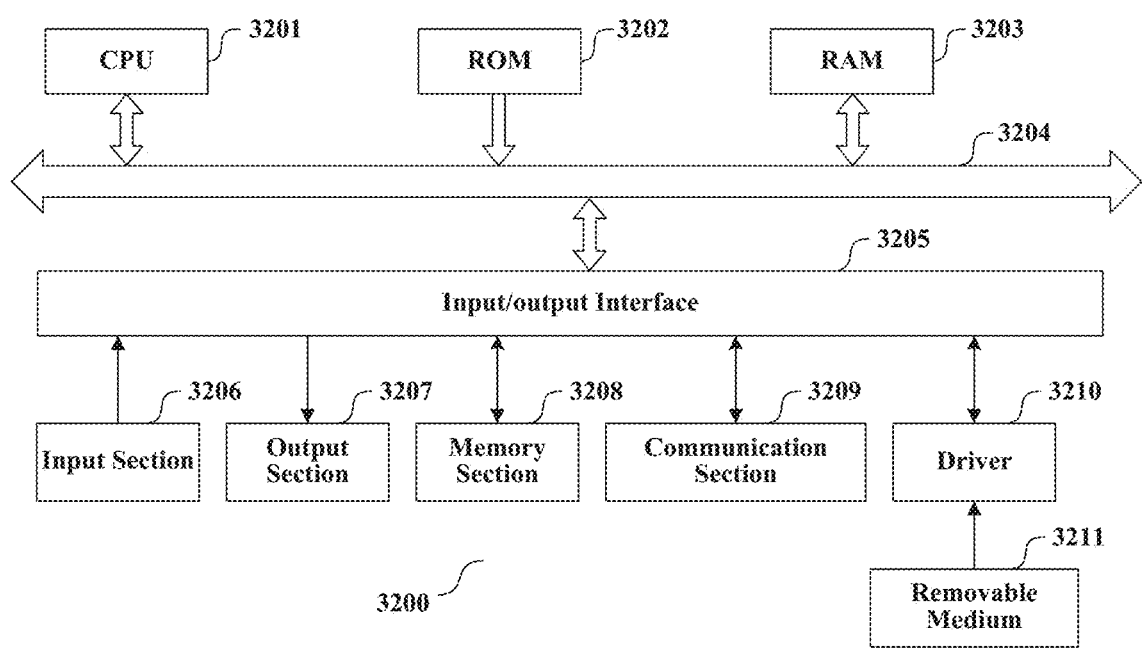
FIG. 32 is a block diagram of an exemplary block diagram illustrating the structure of a general purpose personal computer capable of realizing the method and/or device and/or system according to the embodiments of the present disclosure.

In FIG. 32, a central processing unit (CPU) 3201 executes various processing according to a program stored in a read-only memory (ROM) 3202 or a program loaded to a random access memory (RAM) 3203 from a memory section 3208. The data needed for the various processing of the CPU 3201 may be stored in the RAM 3203 as needed. The CPU 3201, the ROM 3202 and the RAM 3203 are linked with each other via a bus 3204. An input/output interface 3205 is also linked to the bus 3204.

The following components are linked to the input/output interface 3205: an input section 3206 (including keyboard, mouse and the like), an output section 3207 (including displays such as a cathode ray tube (CRT), a liquid crystal display (LCD), a loudspeaker and the like), a memory section 3208 (including hard disc and the like), and a communication section 3209 (including a network interface card such as a LAN card, modem and the like). The communication section 3209 performs communication processing via a network such as the Internet. A driver 3210 may also be linked to the input/output interface 3205, if needed. If needed, a removable medium 3211, for example, a magnetic disc, an optical disc, a magnetic optical disc, a semiconductor memory and the like, may be installed in the driver 3210, so that the computer program read therefrom is installed in the memory section 3208 as appropriate.

In the case where the foregoing series of processing is achieved through software, programs forming the software are installed from a network such as the Internet or a memory medium such as the removable medium 3211.

It should be appreciated by those skilled in the art that the memory medium is not limited to the removable medium 3211 shown in FIG. 32, which has program stored therein and is distributed separately from the apparatus so as to provide the programs to users. The removable medium 3211 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 3202 and the memory section 3208 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The technology may also be implemented as follows.

(1) An electronic apparatus for wireless communications, including:
processing circuitry, configured to:
perform beam failure detection on a currently serving beam using a first quality index of a beam; and
select a candidate beam from among other beams using the first quality index of the beam and a second quality index of the beam which is different from the first quality index, the candidate beam being used for beam recovery after beam failure.

(2) The electronic apparatus according to (1), wherein the processing circuitry is configured to select, from among beams of which the first quality indexes meet a first predetermined condition, one or more beams of which the second quality indexes meet a second predetermined condition and are optimal, as candidate beams.

(3) The electronic apparatus according to (1), wherein the processing circuitry is configured to select, from among beams of which the second quality indexes meet a second predetermined condition, one or more beams of which the first quality indexes meet a first predetermined condition and are optimal, as candidate beams.

(4) The electronic apparatus according to (1), wherein the processing circuitry is configured to sequentially determine, in an order of beam quality indicated by the second quality index from high to low, whether the first quality index of each beam meets a first predetermined condition with respect to beams of which the second quality indexes meet a second predetermined condition, and take a beam of which the first quality index meets the first predetermined condition as a candidate beam until the number of candidate beams reaches a requirement.

(5) The electronic apparatus according to (4), wherein the first quality index is a block error rate of a physical downlink control channel, and the second quality index is reference signal receiving power.

(6) The electronic apparatus according to (1), wherein the processing circuitry is configured to perform beam failure detection by comparing the first quality index of the currently serving beam with a first threshold, and perform a selection of candidate beams by comparing the first quality index of another beam with a third threshold and comparing the second quality index of another beam with a second threshold.

(7) The electronic apparatus according to (6), wherein the third threshold is equal to the first threshold, and beam quality represented by the second threshold is better than beam quality represented by the first threshold.

(8) The electronic apparatus according to (6), wherein beam quality represented by the third threshold is better than beam quality represented by the first threshold, and beam quality represented by the second threshold is better than beam quality represented by the first threshold.

(9) The electronic apparatus according to (6), wherein the processing circuitry is further configured to set a timer when performing the selection of candidate beams, to detecting the first quality index and the second quality index of the beam within a timing duration of the timer, and take a beam as a candidate beam in a case that the first quality index and the second quality index of the beam both meet the predetermined conditions for candidate beams within the timing duration.

(10) The electronic apparatus according to (6), wherein the processing circuitry is configured to acquire, from a base station, setting on one or more of the first threshold, the second threshold and the third threshold, via a radio resource control signaling.

(11) An electronic apparatus for wireless communications, including:
processing circuitry, configured to:
perform detecting on beam quality of a currently serving beam, and determine that a beam failure occurs in a case of the beam quality being lower than first quality; and
in a case of the beam failure occurring, perform detecting on beam quality of another beam, and take the beam as a candidate beam in a case of the beam quality being higher than a second quality,
wherein the second quality is higher than the first quality.

(12) The electronic apparatus according to (11), wherein the processing circuitry is further configured to set a timer when performing selection of candidate beams, to perform detecting on the beam quality of the beam within a timing duration of the timer, and take a beam as the candidate beam in a case that the beam quality of the beam is higher than the second quality within the timing duration.

(13) The electronic apparatus according to (11), wherein the beam quality is represented by a block error rate of a physical downlink control channel or reference signal receiving power.

(14) The electronic apparatus according to (12), wherein the processing circuitry is configured to acquire, from a base station, setting on one or more of the first quality index, the second quality index and the timing duration of the timer, via a radio resource control signaling.

(15) An electronic apparatus for wireless communications, including:
processing circuitry, configured to:
detect beam quality of a currently serving beam; and
start a prediction window when the detected beam quality is within a particular range, and evaluate the beam quality of the currently serving beam within the prediction window.

(16) The electronic apparatus according to (15), wherein the beam quality is represented by one or more of the following: a block error rate of a physical downlink control channel, reference signal receiving power and reference signal receiving quality.

(17) The electronic apparatus according to (15), wherein the particular range includes a range between two thresholds of multiple thresholds for the beam quality.

(18) The electronic apparatus according to (17), wherein the two thresholds include one threshold of multiple thresholds which indicates the worst beam quality.

(19) The electronic apparatus according to (15), wherein the processing circuitry is configured to determine that the beam quality of the currently serving beam is poor, in a case that the number of events that the beam quality is detected within the particular range in the prediction window exceeds a predetermined value, and generate a beam switching request to be transmitted to a base station.

(20) The electronic apparatus according to (19), wherein the processing circuitry is further configured to detect beam quality of other beams in a case of determining the beam quality of the currently serving beam being poor, to select one or more candidate beams as a switching target, and contain the information about the selected candidate beams in the beam switching request.

(21) The electronic apparatus according to (19), wherein the processing circuitry is further configured to start a beam switching window after the beam switching request is transmitted, and monitor a beam switching request response from the base station within the beam switching window.

(22) The electronic apparatus according to (15), wherein the processing circuitry is configured to perform a predetermined number of times of detection on the beam quality of the currently serving beam in the prediction window, record a detection value of each of the detections, and predict whether the currently serving beam would fail based on the recorded detection values.

(23) The electronic apparatus according to (22), wherein the processing circuitry is configured to determine a change tendency of the beam quality of the currently serving beam by comparing a ratio of a subsequent detection value to a previous detection value with a particular parameter, to perform the prediction, wherein the particular parameter is related to an upper limit and a lower limit of the particular range as well as the predetermined number of times.

(24) The electronic apparatus according to (23), wherein the processing circuitry is configured to count comparisons with a consistent change tendency, and predict that the currently serving beam would fail when the counting reaches the predetermined number of times, wherein the processing circuitry is further configured to adjust the predetermined number of times in a case of the change tendency being inconsistent, and predict that the currently serving beam would fail when the counting reaches the adjusted predetermined number of times.

(25) The electronic apparatus according to (24), wherein the processing circuitry is configured to add the following value to the predetermined number of times to perform adjustment: a difference between a sequence number of the previous detection value corresponding to the comparison with the inconsistent change tendency and a sequence number of a preceding proximity detection value of the previous detection value, wherein the preceding proximity detection value is, in a case that the subsequent detection value corresponding to the comparison with the inconsistent change tendency is contained within a range between the subsequent detection value and the previous detection value for which comparison has been performed, the previous detection value of the subsequent detection value and the previous detection value for which comparison has been performed.

(26) The electronic apparatus according to (15), wherein the processing circuitry is further configured to acquire one or more of the following via a radio resource control signaling: information about the particular range, and information about a size of the prediction window.

(27) The electronic apparatus according to (19), wherein the beam switching request further includes an identification of the currently serving beam and beam quality information.

(28) The electronic apparatus according to (18), wherein the processing circuitry is configured to generate a beam failure recovery request to be transmitted to a base station, when it is detected that the beam quality of the currently serving beam is lower than the worst beam quality indicated by a threshold.

(29) An electronic apparatus for wireless communications, including:
processing circuitry, configured to:
determine, based on information about a tail window contained in a beam failure recovery request response from a base station, a size of the tail window to be opened; and
open the tail window and detect beam quality of a new beam within the tail window.

(30) The electronic apparatus according to (29), wherein the processing circuitry is further configured to generate a tail window opening request to be transmitted to the base station simultaneously with a beam failure recovery request.

(31) The electronic apparatus according to (29), wherein
the processing circuitry is further configured to generate a beam failure recovery request when the number of times of detecting that beam quality of a currently serving beam is lower than a predetermined threshold exceeds a first number of times; and
the processing circuitry is further configured to generate a new beam failure recovery request when the number of times of detecting that the beam quality of the new beam is lower than a predetermined threshold exceeds a second number of times in the tail window,
wherein the first number of times is greater than the second number of times.

(32) The electronic apparatus according to (31), wherein
the processing circuitry is further configured to open a beam failure recovery window with a first size after the beam failure recovery request is transmitted, to wait for the beam failure recovery request response; and
the processing circuitry is further configured to open a beam failure recovery window with a second size after the new beam failure recovery request is transmitted, to wait for the beam failure recovery request response,
wherein the first size is greater than the second size.

(33) The electronic apparatus according to (32), wherein the first size and the second size are in units of slots.

(34) An electronic apparatus for wireless communications, including:
processing circuitry, configured to:
generate configuration for beam failure recovery operation of user equipment and contain the configuration in a radio resource control signaling to be provided to the user equipment; and
generate a beam failure recovery request response in response to a beam failure recovery request from the user equipment,
wherein the configuration includes one or more of the following: multiple beam quality thresholds for beam quality evaluation, a first beam quality threshold and a second beam quality threshold for candidate beam selection, a duration of a timer for candidate beam selection, a size of a prediction window for beam quality evaluation.

(35) The electronic apparatus according to (34), wherein the processing circuitry is further configured to generate a beam switching request response with respect to a beam switching request from the user equipment.

(36) The electronic apparatus according to (34), wherein the processing circuitry is further configured to contain information about a size of a tail window in the beam failure recovery request response, and the user equipment detects beam quality of a new beam in the tail window.

(37) A method for wireless communications, including:
performing beam failure detection on a currently serving beam using a first quality index of a beam; and
select a candidate beam from among other beams using the first quality index of the beam and a second quality index of the beam which is different from the first quality index, the candidate beam being used for beam recovery after beam failure.

(38) A method for wireless communications, including:
performing detecting on beam quality of a currently serving beam, and determine that a beam failure occurs in a case of the beam quality being lower than first quality; and
in a case of the beam failure occurring, performing detecting on beam quality of another beam, and taking the beam as a candidate beam in a case of the beam quality being higher than a second quality,
wherein the second quality is higher than the first quality.

(39) A method for wireless communications, including:
detecting beam quality of a currently serving beam; and
starting a prediction window when the detected beam quality is within a particular range, and evaluating the beam quality of the currently serving beam within the prediction window.

(40) A method for wireless communications, including:
determining, based on information about a tail window contained in a beam failure recovery request response from a base station, a size of the tail window to be opened; and
opening the tail window and detect beam quality of a new beam within the tail window.

(41) A method for wireless communications, including:
generating configuration for beam failure recovery operation of user equipment and containing the configuration in a radio resource control signaling to be provided to the user equipment; and
generating a beam failure recovery request response in response to a beam failure recovery request from the user equipment,
wherein the configuration includes one or more of the following: multiple beam quality thresholds for beam quality evaluation, a first beam quality threshold and a second beam quality threshold for candidate beam selection, a duration of a timer for candidate beam selection, a size of a prediction window for beam quality evaluation.

(42) A computer-readable storage medium having computer-executable instructions stored thereon, which, when executed, cause the method for wireless communications according to any one of (37) to (41) to be performed.

The invention claimed is:

1. An electronic apparatus for wireless communications, comprising:
processing circuitry, configured to:
detect beam quality of a currently serving beam; and
start a prediction window when the detected beam quality is within a particular range, and
evaluate the beam quality of the currently serving beam within the prediction window.

2. The electronic apparatus according to claim 1, wherein the beam quality is represented by one or more of the following: a block error rate of a physical downlink control channel, reference signal receiving power and reference signal receiving quality.

3. The electronic apparatus according to claim 1, wherein the particular range comprises a range between two thresholds of multiple thresholds for the beam quality.

4. The electronic apparatus according to claim 1, wherein the processing circuitry is configured to determine that the beam quality of the currently serving beam is poor, in a case that the number of events that the beam quality is detected within the particular range in the prediction window exceeds a predetermined value, and generate a beam switching request to be transmitted to a base station.

5. The electronic apparatus according to claim 4, wherein the processing circuitry is further configured to detecting beam quality of other beams in a case of determining the beam quality of the currently serving beam being poor, to select one or more candidate beams as a switching target, and contain the information about the selected candidate beams in the beam switching request.

6. The electronic apparatus according to claim 4, wherein the processing circuitry is further configured to start a beam switching window after the beam switching request is transmitted, and monitor a beam switching request response from the base station within the beam switching window.

7. The electronic apparatus according to claim 1, wherein the processing circuitry is configured to perform a predetermined number of times of detection on the beam quality of the currently serving beam in the prediction window, record a detection value of each of the detections, and predict whether the currently serving beam would fail based on the recorded detection values.

8. The electronic apparatus according to claim 7, wherein the processing circuitry is configured to determine a change tendency of the beam quality of the currently serving beam by comparing a ratio of a subsequent detection value to a previous detection value with a particular parameter, to perform the prediction, wherein the particular parameter is related to an upper limit and a lower limit of the particular range as well as the predetermined number of times.

9. The electronic apparatus according to claim 8, wherein the processing circuitry is configured to count comparisons with a consistent change tendency, and predict that the currently serving beam would fail when the counting reaches the predetermined number of times, wherein the processing circuitry is further configured to adjust the predetermined number of times in a case of the change tendency being inconsistent, and predict that the currently serving beam would fail when the counting reaches the adjusted predetermined number of times.

10. The electronic apparatus according to claim 1, wherein the processing circuitry is further configured to acquire one or more of the following via a radio resource control signaling: information about the particular range, and information about a size of the prediction window.

11. An electronic apparatus for wireless communications, comprising:
processing circuitry, configured to:
determine, based on information about a tail window contained in a beam failure recovery request response from a base station, a size of the tail window to be opened; and
open the tail window and detect beam quality of a new beam within the tail window.

12. The electronic apparatus according to claim 11, wherein the processing circuitry is further configured to generate a tail window opening request to be transmitted to the base station simultaneously with a beam failure recovery request.

13. The electronic apparatus according to claim 11, wherein
- the processing circuitry is further configured to generate a beam failure recovery request when the number of times of detecting that beam quality of a currently serving beam is lower than a predetermined threshold exceeds a first number of times; and
- the processing circuitry is further configured to generate a new beam failure recovery request when the number of times of detecting that the beam quality of the new beam is lower than a predetermined threshold exceeds a second number of times in the tail window,
- wherein the first number of times is greater than the second number of times, wherein,
- the processing circuitry is further configured to open a beam failure recovery window with a first size after the beam failure recovery request is transmitted, to wait for the beam failure recovery request response; and
- the processing circuitry is further configured to open a beam failure recovery window with a second size after the new beam failure recovery request is transmitted, to wait for the beam failure recovery request response,
- wherein the first size is greater than the second size.

* * * * *